US012726496B2

(12) United States Patent
Brautbar et al.

(10) Patent No.: US 12,726,496 B2
(45) Date of Patent: Sep. 1, 2026

(54) OPERATIONAL PREDICTION ON USER-BASED CONTEXTUAL SESSIONS

(71) Applicant: CrowdStrike, Inc., Sunnyvale, CA (US)

(72) Inventors: Michael Avraham Brautbar, Wayland, MA (US); Ryan Inghilterra, Carlsbad, CA (US); Xiaoning Li, San Diego, CA (US); Aditya Kapoor, Portland, OR (US); Aashma Uprety, Alexandria, VA (US)

(73) Assignee: CrowdStrike, Inc., Sunnyvale, CA (US)

( * ) Notice: Subject to any disclaimer, the term of this patent is extended or adjusted under 35 U.S.C. 154(b) by 192 days.

(21) Appl. No.: 18/410,149

(22) Filed: Jan. 11, 2024

(65) Prior Publication Data

US 2025/0233875 A1 Jul. 17, 2025

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
USPC ............................................................ 726/23
See application file for complete search history.

(56) References Cited

U.S. PATENT DOCUMENTS 10,237,298 B1 3/2019 Nguyen et al.
10,397,236 B1 8/2019 Chadha et al.
10,476,893 B2 11/2019 Baradaran et al.
11,106,789 B2 8/2021 Kraus et al.
11,178,168 B1 11/2021 Lin et al.
(Continued)

FOREIGN PATENT DOCUMENTS

CN 111107096 5/2020

OTHER PUBLICATIONS

Extendend European Search Report mailed Feb. 17, 2025 in Application No. 24222248.7, 14 pages.
(Continued)

*Primary Examiner* — Sakinah White-Taylor
(74) *Attorney, Agent, or Firm* — Law Office of Scott P. Zimmerman, PLLC

(57) ABSTRACT

Contextual session-based operational prediction greatly improves computer functioning. As a cloud service is provided, a current contextual session is generated using multiple events provided by the cloud service. The current contextual session is compared to a contextual session profile. The contextual session profile represents historical contextual sessions that have been historically logged in associated with the cloud service. If the current contextual session conforms to the contextual session profile, then the cloud service is normally operating as historically observed and may be predicted as normal operation. If, however, the current contextual session fails to conform to the contextual session profile, then the cloud service is not operating as historically observed and may be predicted as abnormal operation. Alerts and warning may be generated to notify of abnormal cloud service operation. The contextual session-based operational prediction produces a faster and more accurate detection of the abnormal operation.

20 Claims, 36 Drawing Sheets

(56) References Cited

U.S. PATENT DOCUMENTS

| | | | | |
|---|---|---|---|---|
| 11,729,283 | B2 | 8/2023 | Kim et al. | |
| 11,775,622 | B2 * | 10/2023 | Zhan | G06F 21/316 726/2 |
| 2017/0063903 | A1 * | 3/2017 | Muddu | G06N 20/20 |
| 2020/0213338 | A1 | 7/2020 | Lotem et al. | |
| 2020/0311231 | A1 | 10/2020 | Levin et al. | |
| 2022/0201008 | A1 * | 6/2022 | Stergioudis | H04L 63/1425 |
| 2023/0043793 | A1 | 2/2023 | Shankar et al. | |
| 2023/0216871 | A1 | 7/2023 | Goldstein et al. | |
| 2023/0385447 | A1 * | 11/2023 | Ackerman | G06F 21/6245 |
| 2024/0007492 | A1 | 1/2024 | Shen et al. | |
| 2024/0256354 | A1 * | 8/2024 | Haddock, Jr. | G06Q 30/01 |

OTHER PUBLICATIONS

Unknown, "Anomaly detection policies in Defender for Cloud Apps," Mar. 5, 2023.
Unknown, "Amazon GuardDuty User Guide," 2023, 432 pages.
Applicant's Response to the Search Opinion submitted Jan. 15, 2026 for European Patent Application No. 24222248.7, 20 pages.

* cited by examiner

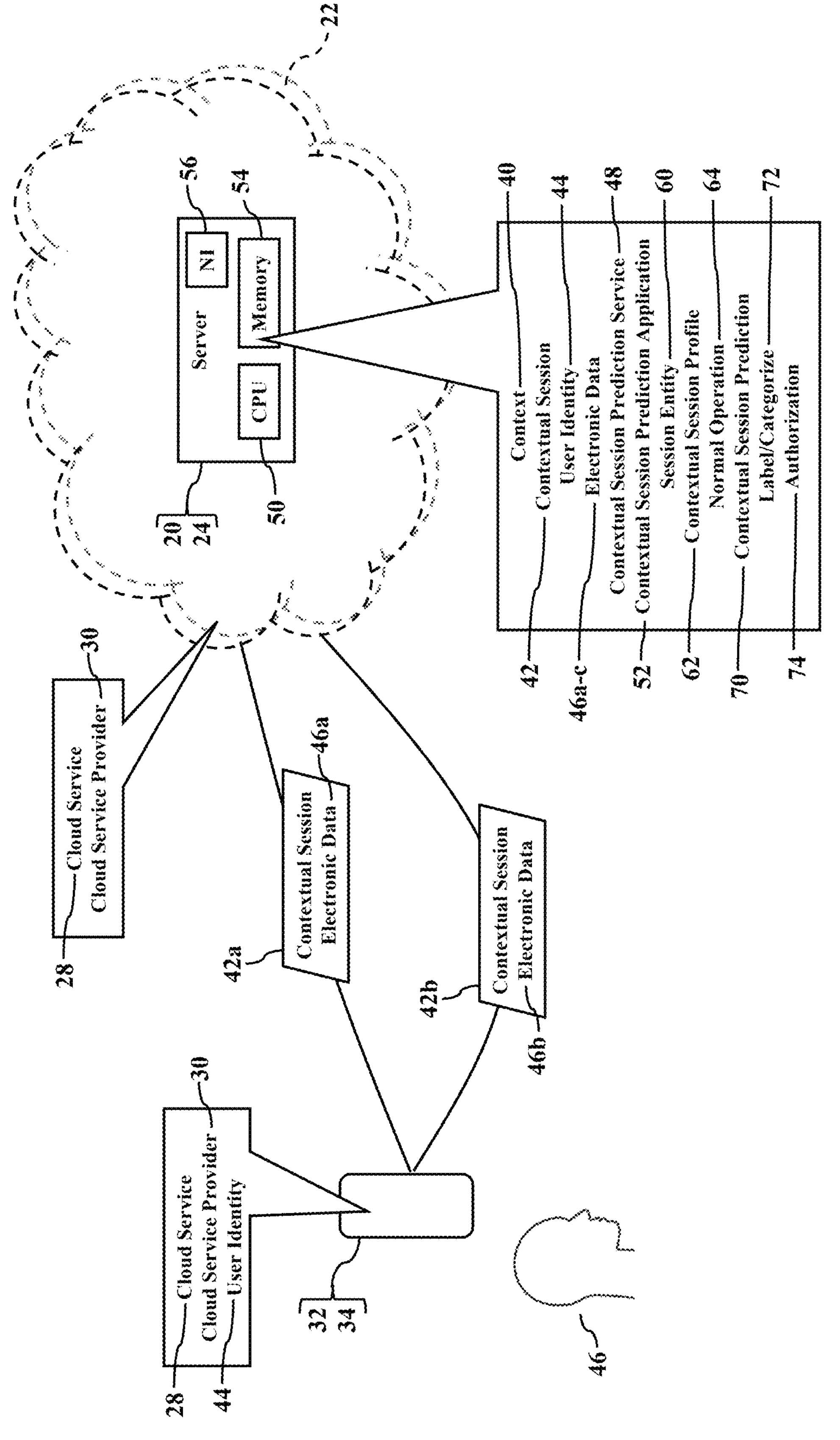

FIG. 2

22
Server
NI
Memory
CPU
56
54
50
20
24
Context
Contextual Session
User Identity
Electronic Data
Contextual Session Prediction Service
Contextual Session Prediction Application
Session Entity
Contextual Session Profile
Normal Operation
Contextual Session Prediction
Label/Categorize
Authorization
40
44
48
60
64
72
42
46a-c
52
62
70
74
Cloud Service
Cloud Service Provider
28
30
Contextual Session
Electronic Data
42a
46a
42b
46b
Cloud Service
Cloud Service Provider
User Identity
28
44
30
32
34
46

Server

CPU

Memory

{Event1, Event2, ... EventN}

Timeframe $t$ $t_0$ $t_f$

Time Stamp
Event Data

Cloud Service
Cloud Service Provider

Cloud Service
Cloud Service Provider
User Identity 22 20 24 50 54 42 90 92 94 96 & 98 28 30 28 30 44 32 34 46

22
Server
CPU
Memory
54
50
20
24
Context
Events
Contextual Session Prediction Service
Contextual Session Prediction Application
API Filter Operation
Abnormal Operation
40
48
102
92
52
80
42
{API Call1, API Call2, ... API CallN}
Timeframe t
$t_0$
$t_f$
Time Stamp
Event Data
90
100
94
96 & 98
Cloud Service
Cloud Service Provider
28
30
User Identity
44
32
34
46

22

Server
Memory
CPU
54
50
20
24

40
42
48 & 52
110
Context
User Identity
Contextual Session
Contextual Session Prediction Service
Contextual Session Prediction Application
Contextual Session Profile
Machine Learning Model
Normal Operation
44
62
64

30
Cloud Service
Cloud Service Provider
28

32
34

46

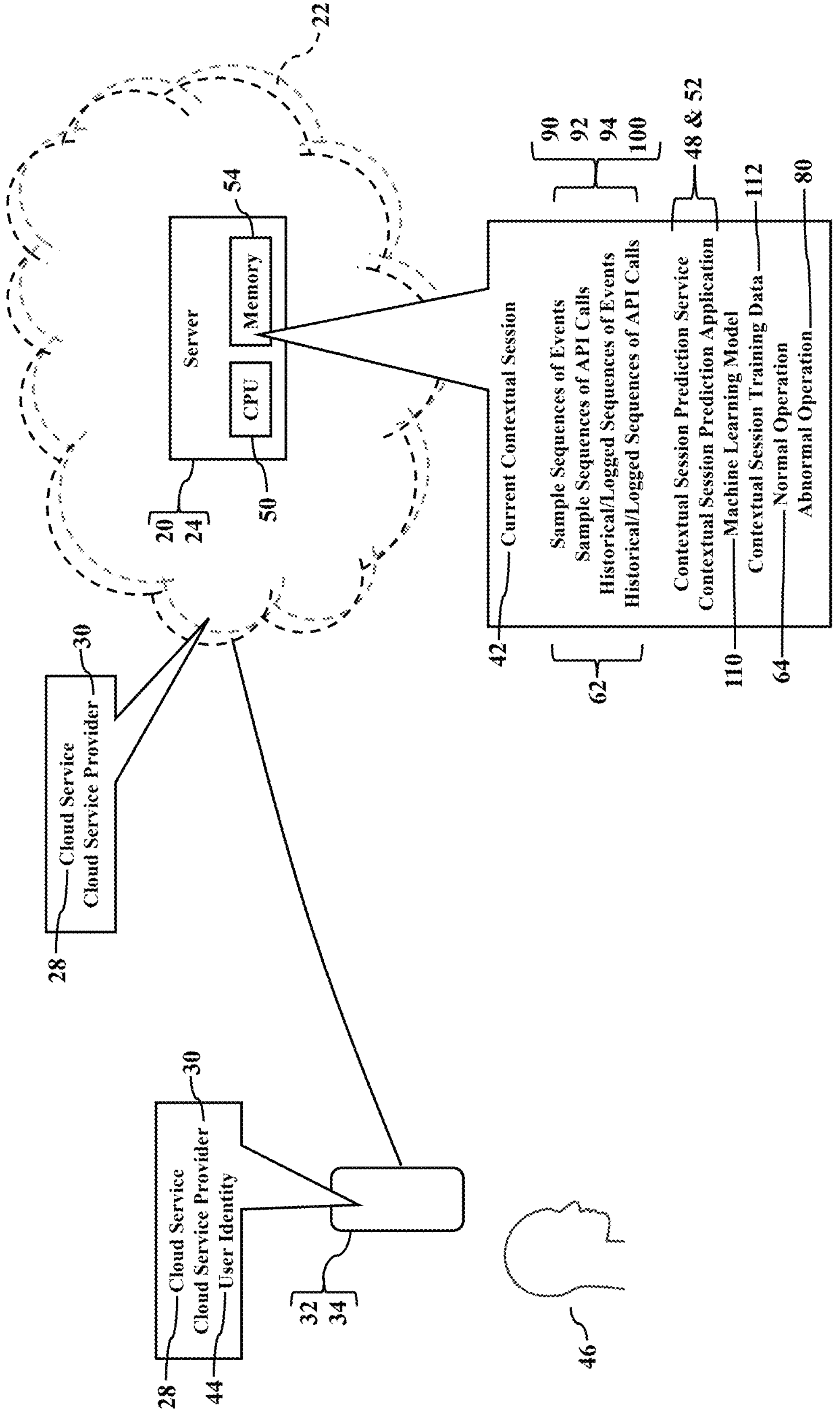

FIG. 7
22
Server
CPU
Memory
54
20
24
50
90
92
94
100
48 & 52
112
80
Current Contextual Session
Sample Sequences of Events
Sample Sequences of API Calls
Historical/Logged Sequences of Events
Historical/Logged Sequences of API Calls
Contextual Session Prediction Service
Contextual Session Prediction Application
Machine Learning Model
Contextual Session Training Data
Normal Operation
Abnormal Operation
42
62
110
64
30
Cloud Service
Cloud Service Provider
28
User Identity
44
32
34
46

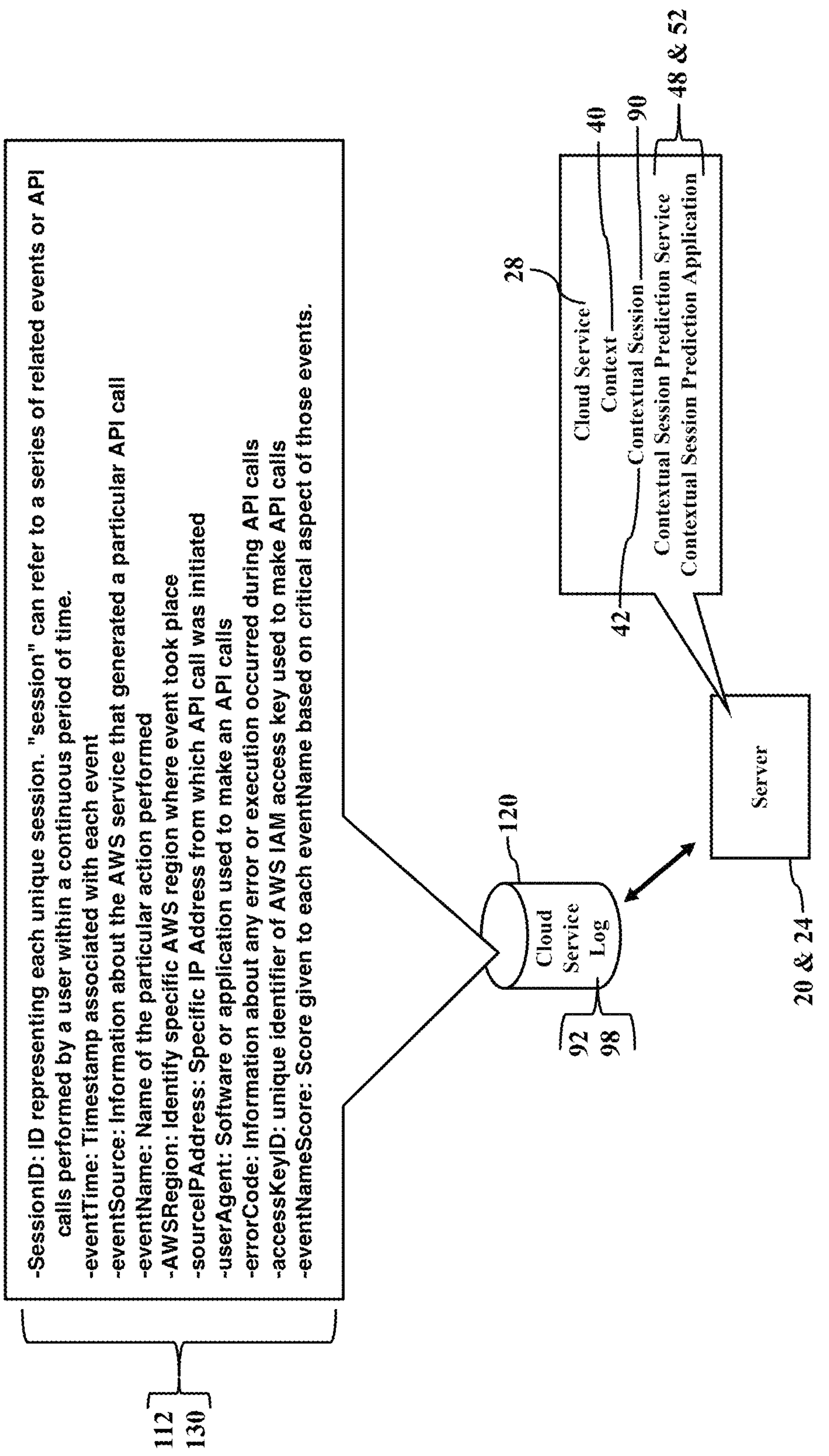

FIG. 11
-SessionID: ID representing each unique session. "session" can refer to a series of related events or API calls performed by a user within a continuous period of time.
-eventTime: Timestamp associated with each event
-eventSource: Information about the AWS service that generated a particular API call
-eventName: Name of the particular action performed
-AWSRegion: Identify specific AWS region where event took place
-sourceIPAddress: Specific IP Address from which API call was initiated
-userAgent: Software or application used to make an API calls
-errorCode: Information about any error or execution occurred during API calls
-accessKeyID: unique identifier of AWS IAM access key used to make API calls
-eventNameScore: Score given to each eventName based on critical aspect of those events.
112
130
120
Cloud Service Log
92
98
Server
20 & 24
28
Cloud Service
40
Context
90
Contextual Session
42
Contextual Session Prediction Service
Contextual Session Prediction Application
48 & 52

Figure 12:
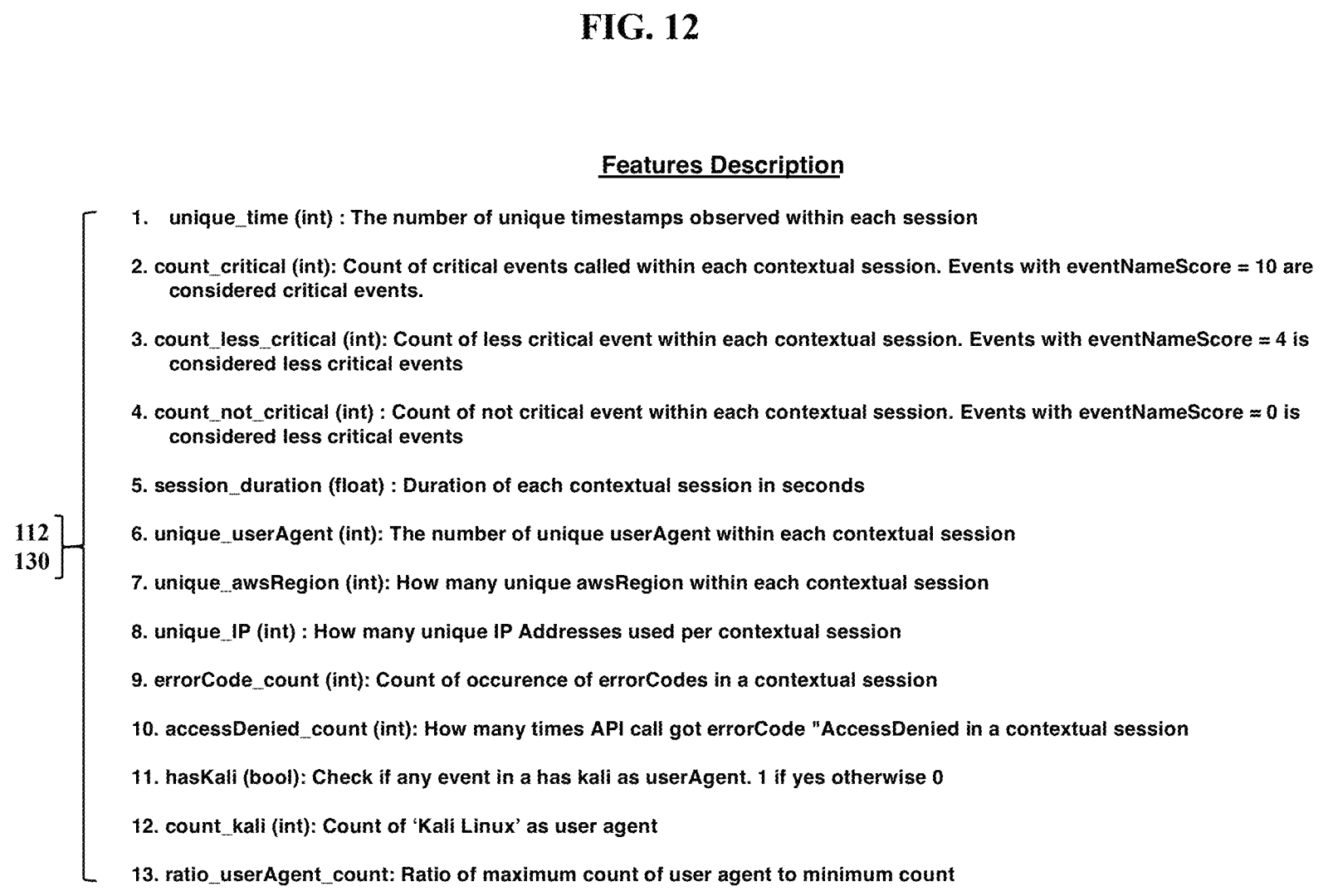

Features Description 1. unique_time (int) : The number of unique timestamps observed within each session
2. count_critical (int): Count of critical events called within each contextual session. Events with eventNameScore = 10 are considered critical events.
3. count_less_critical (int): Count of less critical event within each contextual session. Events with eventNameScore = 4 is considered less critical events
4. count_not_critical (int) : Count of not critical event within each contextual session. Events with eventNameScore = 0 is considered less critical events
5. session_duration (float) : Duration of each contextual session in seconds
6. unique_userAgent (int): The number of unique userAgent within each contextual session
7. unique_awsRegion (int): How many unique awsRegion within each contextual session
8. unique_IP (int) : How many unique IP Addresses used per contextual session
9. errorCode_count (int): Count of occurence of errorCodes in a contextual session
10. accessDenied_count (int): How many times API call got errorCode "AccessDenied in a contextual session
11. hasKali (bool): Check if any event in a has kali as userAgent. 1 if yes otherwise 0
12. count_kali (int): Count of 'Kali Linux' as user agent
13. ratio_userAgent_count: Ratio of maximum count of user agent to minimum count

FIG. 13

CloudTrail that includes actual anomalous record

Anomalous record in this dataset #1:

-User 'x' is considered for modelling. User 'x' was recorded as performing anomalous activity
-30 unique sessions for this user
-Anomalous session in data (Create user for backdoor)

2022_08_09T16_38_12Z.
arn_aws_iam__fa84303bac391b40a4348236acb2d3d276945604c468b50b37e00332_bdc5617141ae418134d5873f5cc78f4213ae734c_sysad
min 112
130
80

FIG. 14

-Publicly available CloudTrail data
-Example anomalous activities
-'Level6' which is an IaM user is considered for modelling
-444 unique contextual sessions for this user
-To validate the models, use following anomalous contextual sessions with session_ids as below, which are considered anomalous based on domain knowledge:

1.Create User for backdoor
2018_08_11T17_40_25Z.arn_aws_iam__811596193553_user_Level6

2.Kali Linux as userAgent
2018_10_10T20_17_24Z.arn_aws_iam__811596193553_user_Level6
2018_10_12T15_08_38Z.arn_aws_iam__811596193553_user_Level6
2019_07_25T09_40_55Z.arn_aws_iam__811596193553_user_Level6.

3. Many RunInstance errors
2019_08_21T07_41_19Z.arn_aws_iam__811596193553_user_Level6

112
130
80

22
28
Cloud Service
Cloud Service Provider
30
20
32
162
164
168
Software Applications
170
Operating System
166
Cyber Security Sensory Agent
92
Events
Contextual Session Prediction Service
Contextual Session Prediction Application
48 & 52
Current Contextual Session
42
Contextual Session Prediction
70
Normal Operation
Abnormal Operation
64 & 80

Hyperparameter for hdbscan: metric='euclidean', min_cluster_size= 100, min_samples = 4

Hyperparameter: metric='euclidean',min_cluster_size= 2, min_samples = 1
Cluster 1
Cluster 0
Anomalous Sessions from HDBSCAN
Cluster 2
Anomalous sessions from Domain Knowledge
component1
component2
0.0
0.5
1.0
1.5
2.0
0.00
0.25
0.50
0.75
1.00
1.25
1.50
1.75
2.00

FIG. 31

| Data | Dataset #1 | | Dataset #2 | |
|---|---|---|---|---|
| Total Session | 444 | | 30 | |
| Anomalous sessions from domain knowledge | 5 | | 1 | |
| | HDBSCAN | Isolation Forest | HDBSCAN | Isolation Forest |
| Total flagged sessions (TP+FP) | 7 | 9 | 5 | 3 |
| Domain knowledge anomalous session flagged (TP) | 2 | 5 | 1 | 1 |
| Precision ( TP/(TP+FP ) | 29% | 56% | 20% | 33% |
| Recall ( TP/(TP+FN ) | 40% | 100% | 100% | 100% |
| Flag Rate ((TP+FP)/Total Session) | 1.6% | 2.1% | 16.7% | 10% |

Start

210 Generate contextual session using multiple events representing context associated with user identity & cloud service 212 Compare contextual session to contextual session profile generated by machine learning model using historical contextual sessions associated with user identity & cloud service 214 Generate contextual session prediction End

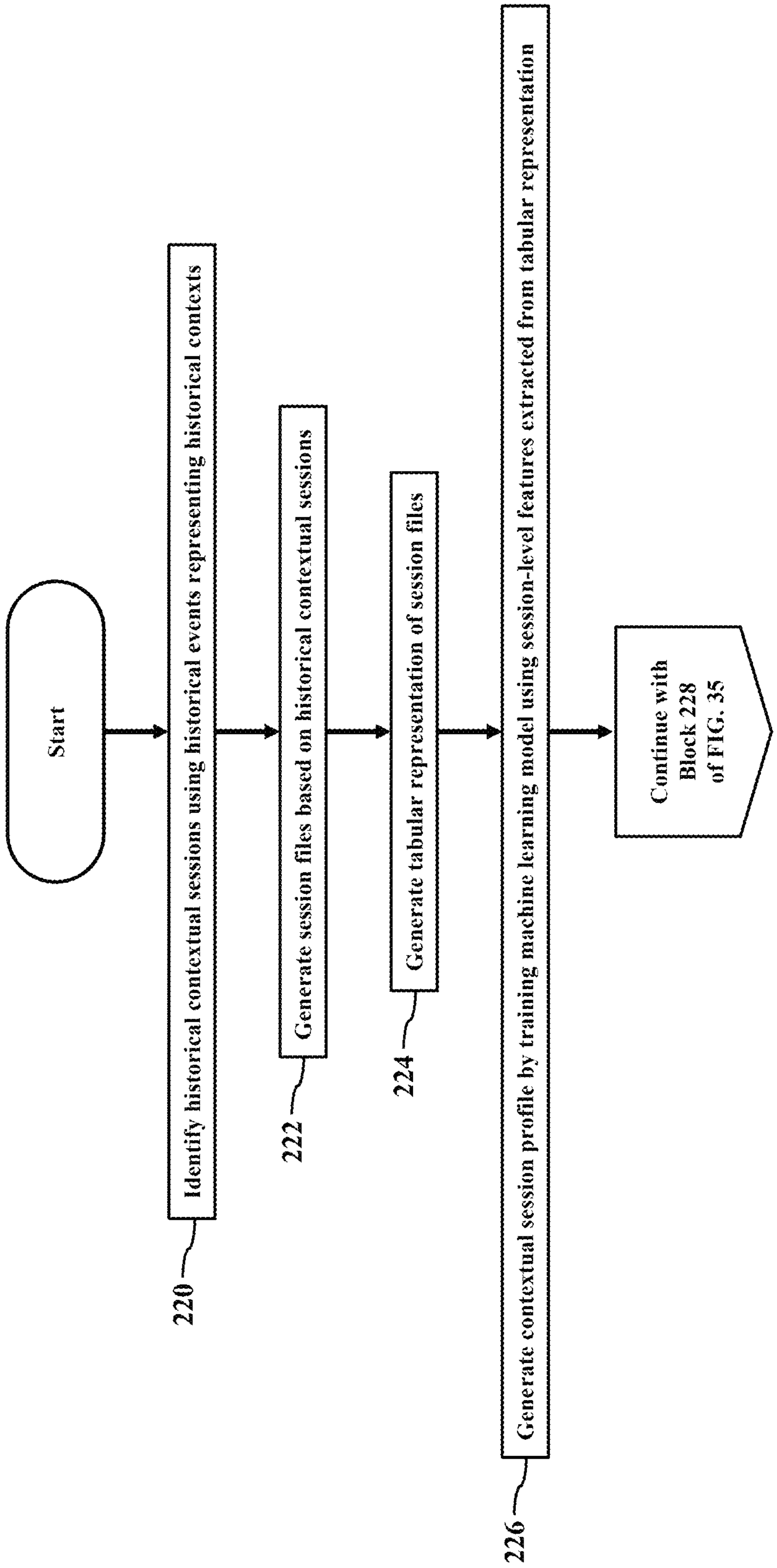

FIG. 34

Start

220 Identify historical contextual sessions using historical events representing historical contexts 222 Generate session files based on historical contextual sessions 224 Generate tabular representation of session files 226 Generate contextual session profile by training machine learning model using session-level features extracted from tabular representation Continue with Block 228 of FIG. 35

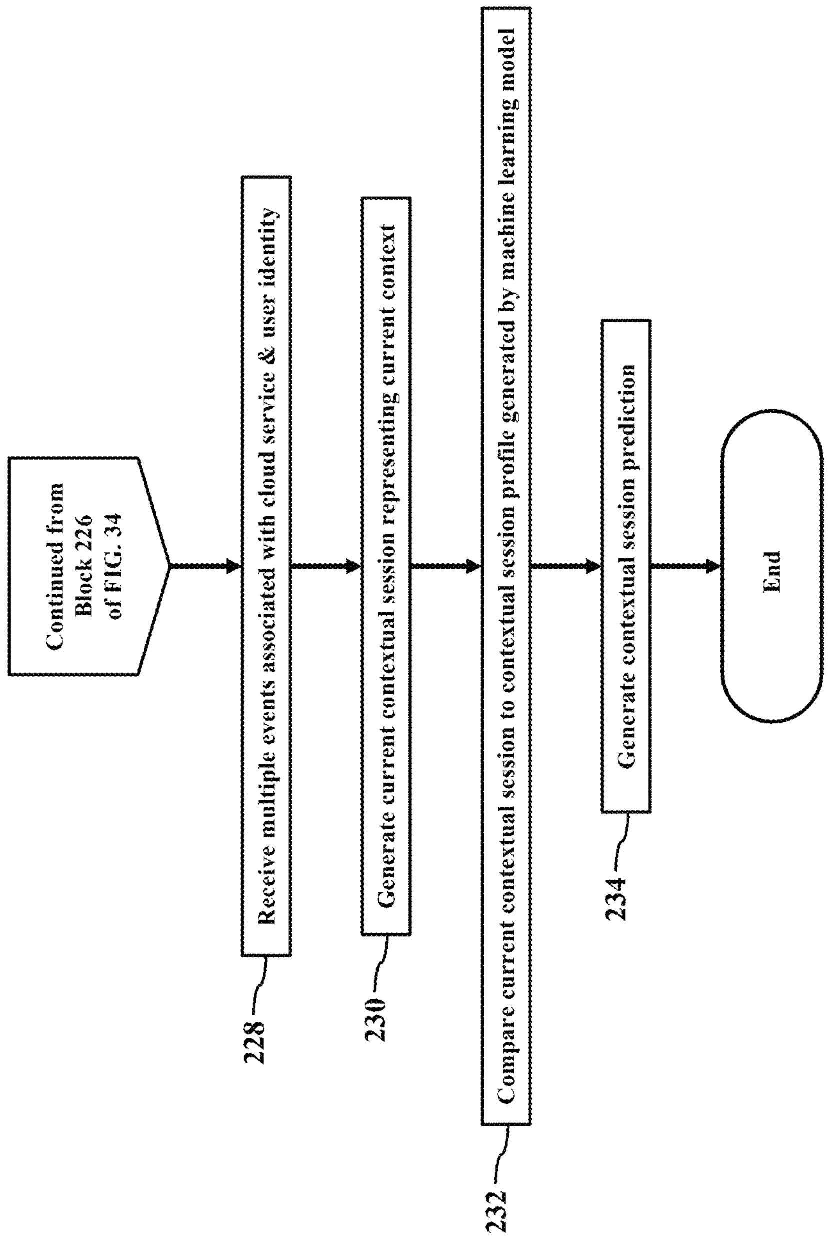
FIG. 35
Continued from Block 226 of FIG. 34
228 Receive multiple events associated with cloud service & user identity
230 Generate current contextual session representing current context
232 Compare current contextual session to contextual session profile generated by machine learning model
234 Generate contextual session prediction
End

OPERATIONAL PREDICTION ON USER-BASED CONTEXTUAL SESSIONS

BACKGROUND

The subject matter described herein generally relates to computers and to computer security and, more particularly, the subject matter relates to monitoring computer behavior.

Cloud computing services must be protected from cyber threats. Cloud computing services provide essential resources that are used every day by businesses and by people. Cloud computing services, though, are vulnerable to cyber threats. Indeed, nearly every day we ready of another cyber attack. Cloud service providers thus strive to detect and stop cyber threats.

SUMMARY

Contextual session-based prediction produces faster and more accurate detections of abnormal user behavior. As a cloud service is provided by a cloud computing environment, a user's current contextual session is generated using multiple events provided by the cloud computing environment. The user's current contextual session is compared to a contextual session profile. The contextual session profile represents historical contextual sessions that have been historically logged by the cloud computing environment. If the user's current contextual session conforms to the contextual session profile, then the cloud service may be normally operating as historically observed. The current contextual session may thus be predicted as normal operation. If, however, the user's current contextual session fails to conform to the contextual session profile, then the cloud service is not operating as historically observed. The user's current contextual session may thus be predicted as evidence of abnormal operation. Because the cloud service is not operating as historically observed, alerts and warnings may be generated to notify a service provider of abnormal cloud service operation. By using multiple events to generate contextual sessions, normal and abnormal operational predictions are far more accurate in detecting suspicious operational behavior.

BRIEF DESCRIPTION OF THE SEVERAL VIEWS OF THE DRAWINGS

The features, aspects, and advantages of user identity contextual session-based prediction are understood when the following Detailed Description is read with reference to the accompanying drawings, wherein:

FIGS. 1-3 illustrate some examples of monitoring cloud services for abnormal operation;

FIGS. 6-8 illustrate examples of machine learning;

FIGS. 11-14 illustrate examples of contextual session training data;

FIGS. 20-31 illustrate experimental results;

FIGS. 34-35 illustrate more examples of a method or operations for monitoring the cloud service.

DETAILED DESCRIPTION

Figure 1:
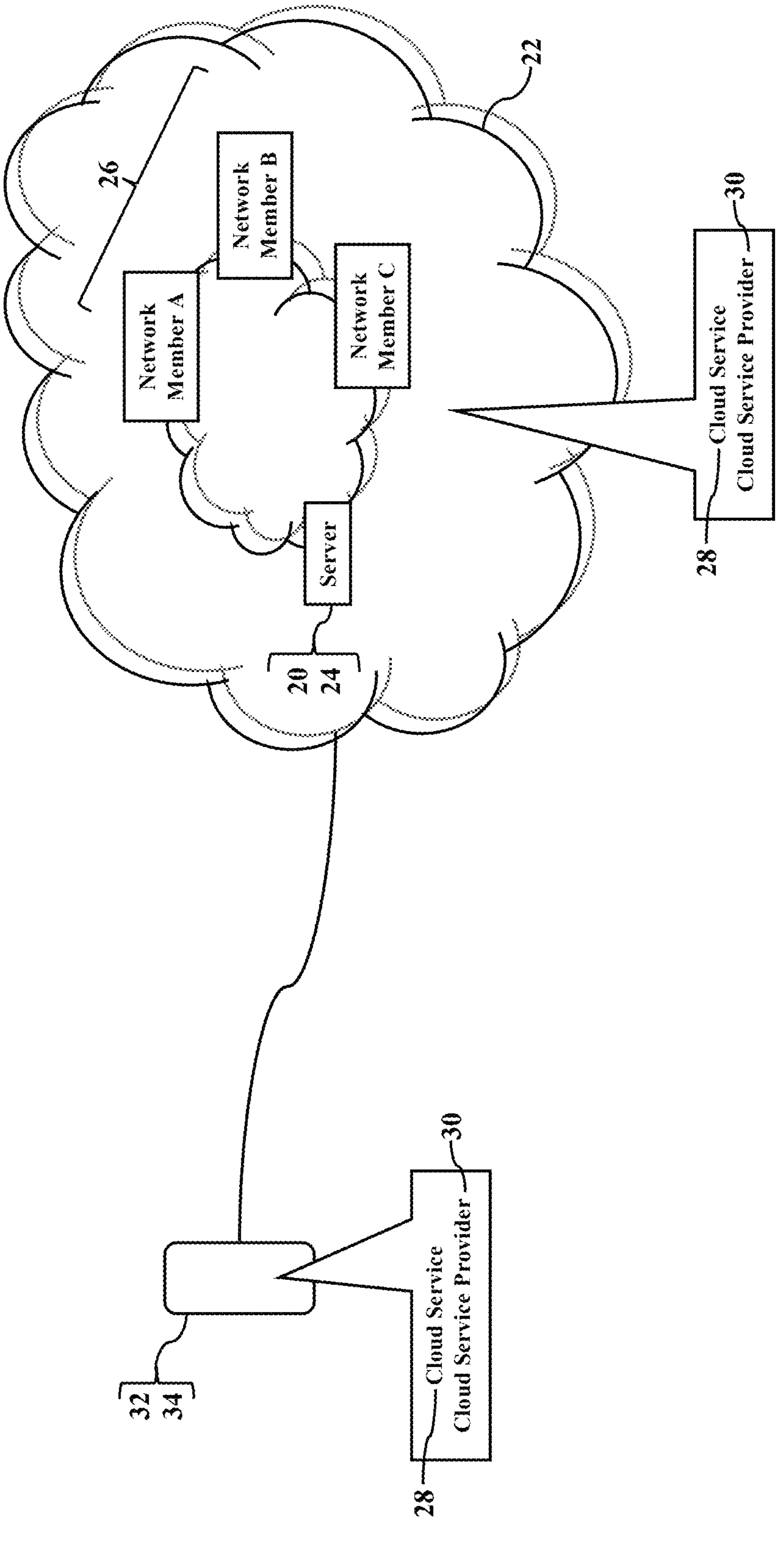

Some examples relate to predicting abnormal operations in cloud services. Every day businesses and individuals use many different cloud services provided by many different cloud service providers. As simple examples, we use our computers and smartphones to access cloud services offered by GOOGLE®, MICROSOFT®, AMAZON®, NETFLIX®, FACEBOOK®, and UBER®. Hackers are thus always trying to infiltrate cloud services and to steal passwords and other valuable/personal information. A contextual session prediction service, though, stops hacking of cloud services. The contextual session prediction service programs a computer system to monitor any cloud service for abnormal operation. The contextual session prediction service, for example, determines a user's current context associated with the cloud service. The user's current context may then be compared to historical contexts. The contextual session prediction service then predicts whether the user's current context is normal/safe operation or whether the current context is abnormal operation. When, for example, the user's current context resembles historical norms, then the contextual session prediction service may predict that normal operation is being attempted. When, however, the user's current context differs from historical norms, the contextual session prediction service may predict that abnormal operation is being attempted. Any abnormal operation may be evidence of a potential cyber security threat. The contextual session prediction service may thus generate alerts and warnings that abnormal operation has been detected. The contextual session prediction service may thus hand-off the abnormal operation to other systems for deeper analysis.

The contextual session prediction service is more accurate. The contextual session prediction service generates more accurate results than conventional cyber security schemes. The contextual session prediction service represents different contexts using contextual sessions. Each contextual session is generated using a sequence of multiple events associated with the user's identity. Each event describes an action or activity taken by the cloud service provided on behalf of the user. By monitoring sequences of multiple events taken by the cloud service, the contextual session prediction service predicts which sequences are normal and which sequences are abnormal. The conventional cyber security schemes, instead, only inspect a single event at a time. A single event, though, provides no contextual insight into usage and potential cyber threats. Conventional cyber security schemes thus generate many false-positive detections which waste significant computer, network, and human resources. The contextual session prediction service, instead, tracks and monitors contextual sessions that represent different contexts associated with the cloud service. The sequences of multiple events are compared to historical sequential norms. Should any current sequence of multiple events differ from the historical sequential norms, then abnormal operation may be predicted. Alerts are generated that warn of a potential cyber threat.

Contextual session-based operational prediction will now be described more fully hereinafter with reference to the accompanying drawings. Contextual session-based operational prediction, however, may be embodied in many different forms and should not be construed as limited to the examples set forth herein. These examples are provided so that this disclosure will be thorough and complete and fully convey contextual session-based operational prediction to those of ordinary skill in the art. Moreover, all the examples of contextual session-based operational prediction are intended to encompass both structural and functional equivalents thereof. Additionally, it is intended that such equivalents include both currently known equivalents as well as equivalents developed in the future (i.e., any elements developed that perform the same function, regardless of structure).

Figure 3:
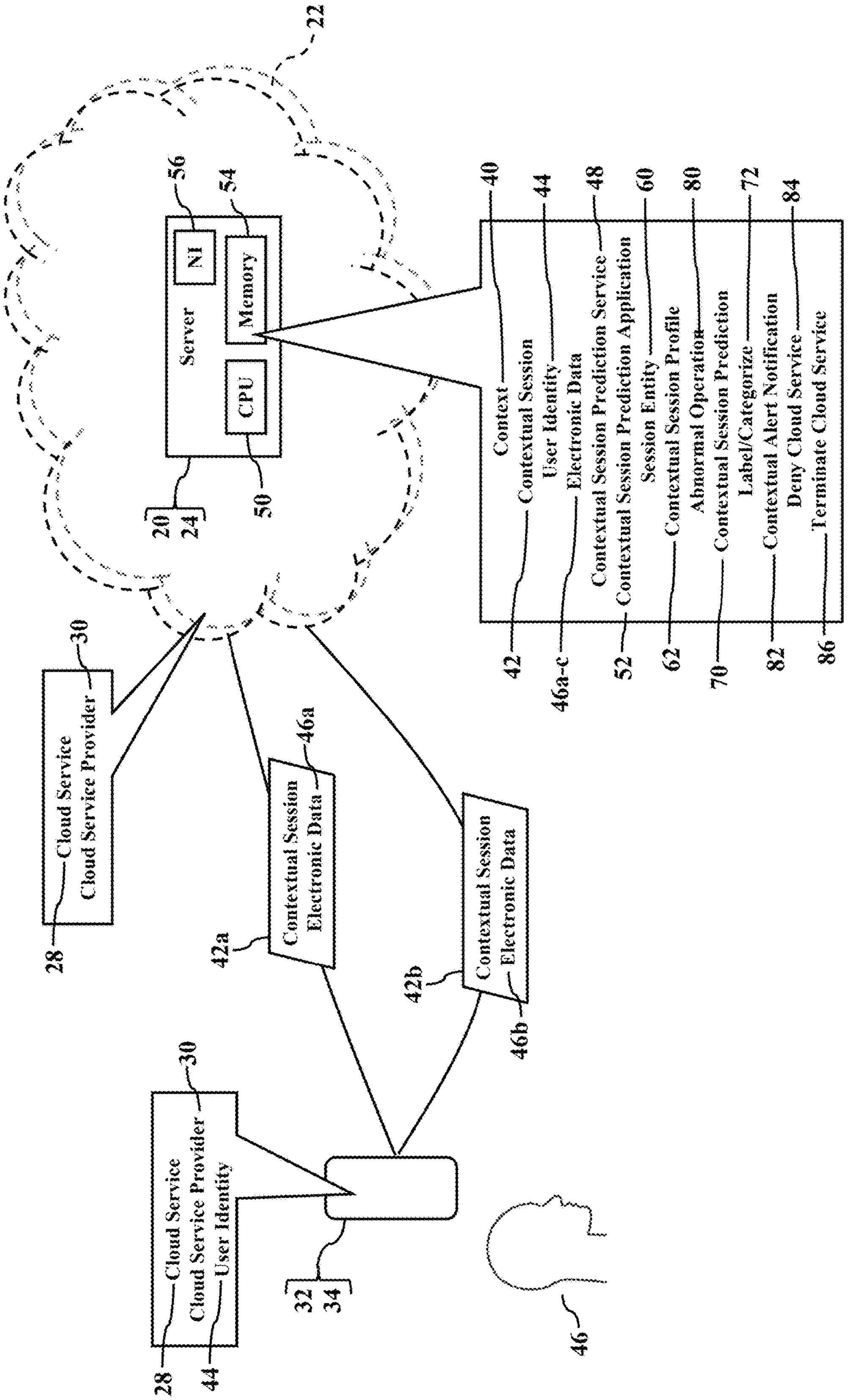

FIGS. 1-3 illustrate some examples of monitoring cloud services for abnormal operation. A computer system 20 operates in a cloud computing environment 22. FIG. 1 illustrates the computer system 20 as a server 24. The computer system 20, though, may be any processor-controlled device, as later paragraphs will explain. In this example, the server 24 communicates via the cloud-computing environment 22 (e.g., public Internet, private network, and/or hybrid network) with other servers, devices, computers, or other networked members 26 operating within, or affiliated with, the cloud-computing environment 22. The cloud computing environment 22 provides one or more cloud services 28 on behalf of a cloud service provider 30. There are many different cloud services 28, such as file sharing, cloud storage, email, cyber security, social networking, video conferencing, entertainment, shopping, and banking. There are also many different cloud service providers 30, such as GOOGLE CLOUD®, MICROSOFT AZURE®, AMAZON WEB SERVICES®, NETFLIX®, ZOOM®, FACEBOOK®, and UBER®. Whatever the cloud service 28, and whatever the cloud service provider 30, the cloud service 28 may be requested by, and/or provided on behalf of, a client device 32. FIG. 1 illustrates the client device 32 as a mobile smartphone 34, but the client device 32 may be any processor-controlled device.

FIG. 2 illustrates examples of predictive, behavioral contexts 40. The server 24 may be programmed to monitor the cloud service 28 and to predict and/or detect both normal and abnormal contexts 40 associated with the client device 32 (again illustrated as the smartphone 34). As the smartphone 34 interacts with, uses, or receives the cloud service 28 provided by the cloud computing environment 22, the server 24 monitors or inspects a contextual session 42. The contextual session 42 represents the context 40 associated with the cloud service 28, with the client device 32, and/or with a user identity 44. As a human user 46 interacts with the smartphone 34, the human user 46 may establish the unique user identity 44 by inputting login credentials to the smartphone 34. The user 46 may additionally or alternatively register and/or login to the cloud service 28. As the user's smartphone 34 interacts with the cloud computing environment 22, the server 24 monitors the contextual sessions 42. The contextual session 42*a*, for example, may be represented by any electronic data 46*a* sent from the smartphone 34 to the cloud computing environment 22 providing the cloud service 28. The contextual session 42*b*, as another example, may additionally or alternatively be represented by any electronic data 46*b* sent from the cloud service 28 to the smartphone 34. The contextual session 42*c*, as still another example, may additionally or alternatively be represented by any electronic data 46*c* utilized or generated by the cloud service 28 when providing the cloud service 28. So, whatever the contextual session 42, as the cloud computing environment 22 provides the cloud service 28, the cloud computing environment 22 may send or forward the current contextual session 42 to the server 24 for monitoring and analysis. When the server 24 receives the contextual session 42, the server 24 may provide a cloud-based contextual session prediction service 48 to, or on behalf of, the cloud computing environment 22. The server 24 has at least one hardware processor 50 (illustrated as "CPU") that executes a contextual session prediction application 52 stored in a memory device 54. The server 24 also has network interfaces (illustrated as "NI") 56 to multiple communications networks (such as the cloud computing environment 22), thus allowing bi-directional communications with other networked devices and services. When the server 24 receives the contextual session 42, the contextual session prediction application 52 may be a computer program, instruction(s), or code that instructs or causes the server 24 to inspect the contextual session 42, to determine the context 40, and to predict the cyber safety of the contextual session 42.

The server 24 performs the fast and effective contextual session prediction service 48. When the server 24 receives the contextual session 42, the server 24 executes the contextual session prediction application 52 as a contextual predictor engine. The server 24 may ingest the contextual session 42 as an input. Because the contextual session 42 is also associated with the user identity 44, the contextual session 42 has a unique contextual session entity 60 that is specific to the user 46. The contextual session prediction application 52 instructs the server 24 to compare the contextual session 42 to a contextual session profile 62. The contextual session profile 62 defines, specifies, or represents predetermined or known contextual sessions 42 that have been assessed or prescribed as safe or normal operation 64. The contextual session profile 62, in other words, may describe habitual, routine, and/or harmless contextual sessions 42 associated with the user's safe/harmless historical contexts 40. The contextual session profile 62 may represent historical, behavioral past usage associated with the same user identity 44 and/or with the same smartphone 34. The contextual session profile 62 may thus represent historical logs, information, actions, inputs, bits/bytes, values, averages/ranges, and/or other electronic data 46 that is/are known to indicate the normal operation 64. The contextual session profile 62, as a simple example, may store or represent statistical ranges or values (e.g., $\pm 3\sigma$ standard deviations) describing past or historical contextual sessions 42 that have been previously logged and/or assessed as the normal operation 64. Whatever electronic data 46 is described by, or included with, the contextual session 42, that electronic data 46 may be compared to the contextual session profile 62.

A contextual session prediction 70 may be generated. Once the current contextual session 42 is compared to the contextual session profile 62, the contextual session prediction application 52 may generate the contextual session prediction 70. As an example, if the current contextual session 42 equals, matches, satisfies, lies within, or conforms to the contextual session profile 62, then the contextual session prediction application 52 may determine that the contextual session 42 is the safe or normal operation 64. The current contextual session 42, representing the current context 40, has been historically observed and/or assessed as the safe or normal operation 64. Because the contextual session 42 conforms to the contextual session profile 62, the contextual session prediction application 52 may further label or categorize 72 the contextual session 42 as the safe or normal operation 64. Moreover, because the contextual session 42 conforms to the contextual session profile 62, the contextual session prediction application 52 may further authorize or approve 74 the cloud service 28 (perhaps by generating an authorization message or other notification that is sent to the cloud computing environment 22).

FIG. 3 illustrates examples of predictive, abnormal contexts 40. The server 24 may also be programmed to detect abnormal operations 80 associated with the client device 32 and/or with the user identity 44. As the client device 32 (again illustrated as the smartphone 34) interacts with, uses, or receives the cloud service 28 provided by the cloud computing environment 22, the server 24 may again monitor or inspect the contextual session 42 and compare to the contextual session profile 62. The contextual session prediction application 52 may again generate the contextual session prediction 70. In these examples, though, the contextual session 42 fails to conform to the contextual session profile 62. That is, the contextual session 42 is unequal to, does not match, does not satisfy, or lies outside of the contextual session profile 62. When the contextual session 42 fails to conform to the contextual session profile 62, then the contextual session prediction application 52 may determine that the contextual session 42 describes the abnormal operation 80. The contextual session 42, representing the context 40, does not conform to historical safe/normal observations, or the contextual session 42 has been prescribed as known abnormal operation 80. Because the contextual session 42 fails to conform to the contextual session profile 62, the contextual session prediction application 52 may further label or categorize 72 the contextual session 42 as the abnormal operation 80. Moreover, because the contextual session 42 does not conform to the contextual session profile 62, the contextual session prediction application 52 may generate a contextual alert notification 82 indicating the contextual session 42 represents the abnormal operation 80. The contextual alert notification 82 may be sent to any network address (e.g., IP address) associated with any supervisory or notification system associated with the cloud computing environment 22. As more examples, because the contextual session 42 does not conform to the contextual session profile 62, the contextual session prediction application 52 may have supervisory control, approval, or other authorization to at least one of deny 84 the cloud service 28 or, if already commenced, terminate 86 the cloud service 28. The contextual session prediction application 52 may thus stop the cloud service 28 to prevent any possible malicious context 40 that could harm the cloud service 28, the cloud computing environment 22, the server 24, and/or the client device 32.

Figure 4:
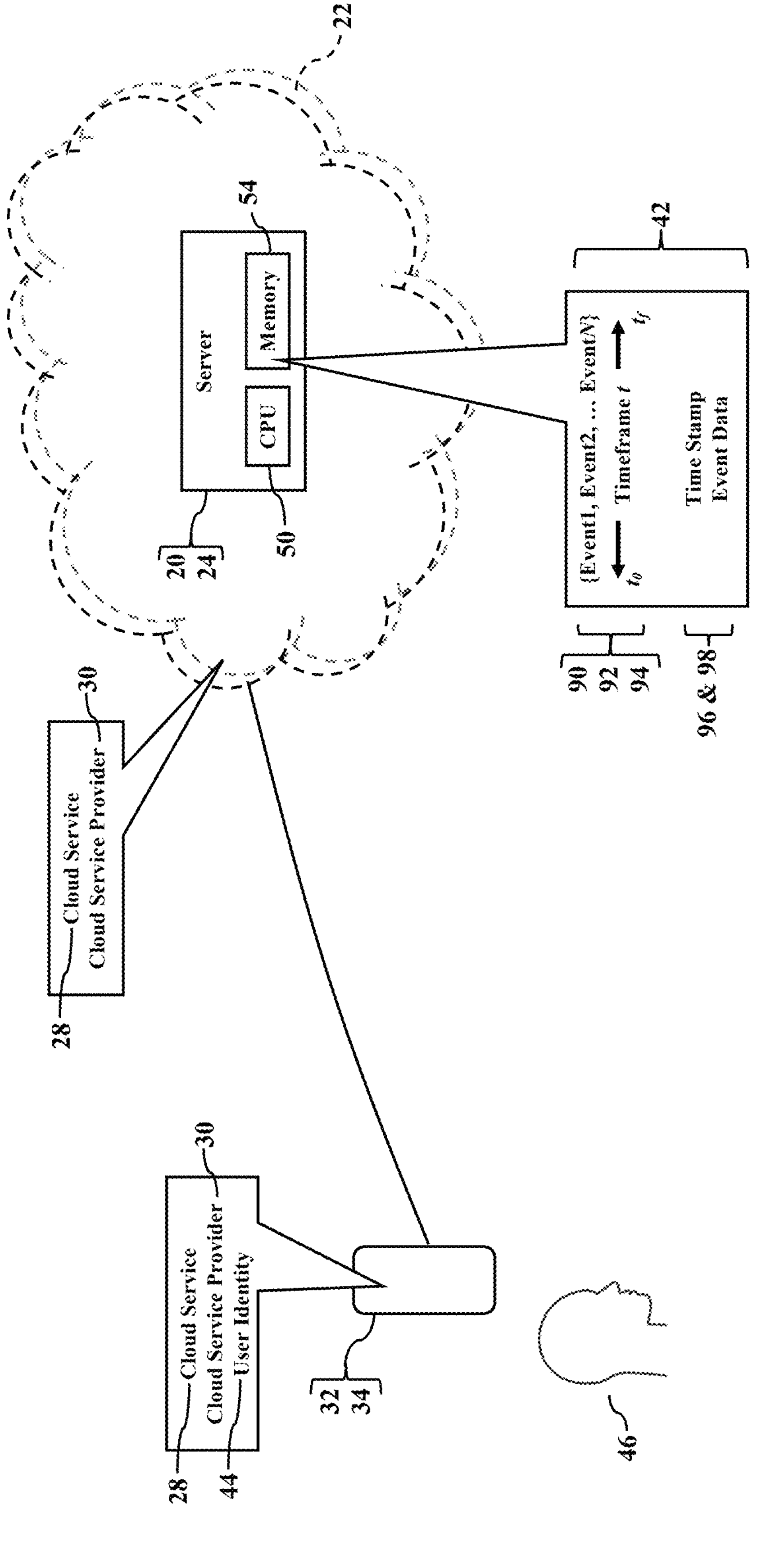
FIGS. 4-5 illustrate examples of contextual sessions.
Figure 5:
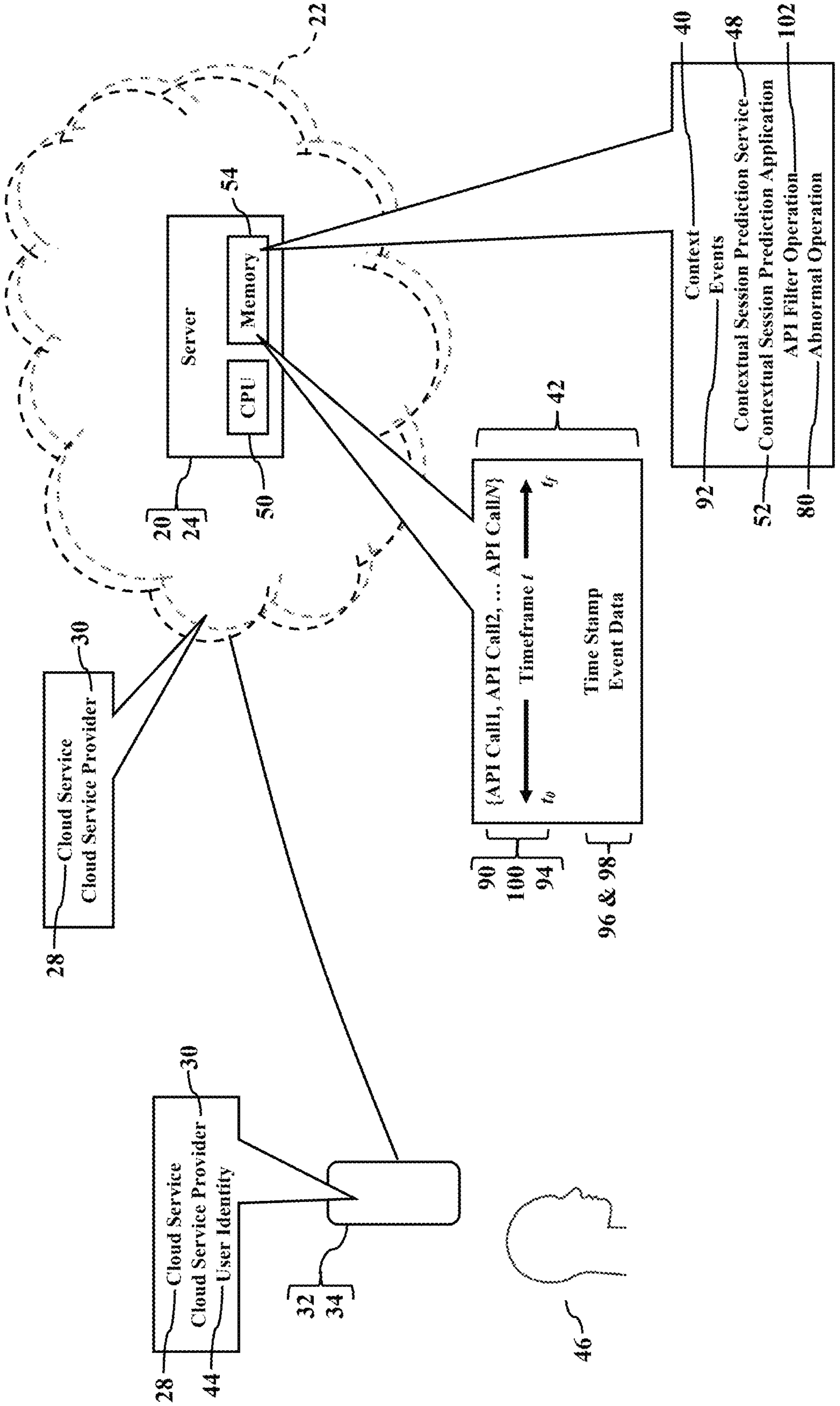

FIGS. 4-5 illustrate examples of the contextual session 42. The contextual session 42 represents the context 40 associated with the cloud service 28, with the client device 32, and/or with the user identity 44. The contextual session 42 may include or represent any communications, activities, behaviors, data values, patterns, login/location information, or any other electronic data 46. As FIG. 4 illustrates, though, in this example the contextual session 42 may be represented as a sequence 90 of multiple hardware and/or software events 92 occurring within a timeframe $t_0$-$t_f$ (illustrated as reference numeral 94). The cloud computing environment 22 collects the events 92 and provides the events 92 to the server 24 for analysis. The cloud computing environment 22 may forward the events 92 all associated with the client device 32 and/or with the user identity 44. When the server 24 receives the events 92, the contextual session prediction application 52 may then cause or instruct the hardware processor 50 to generate the contextual session(s) 42 using the events 92. Each event 92 represents a service action or activity associated with the cloud service 28 provided on behalf of the client device 32 and/or the user identity 44. Some events 92, for example, may represent the user's login/authentication inputs to, or associated with, the client device 32 (again illustrated as the smartphone 34). Other events 92, for example, may represent the user's inputs, selections, or commands associated with the cloud service 28. Still other events 92 may describe actions or activities taken by the cloud computing environment 22 to provide the cloud service 28. Whatever the event 92, each event 92 may be associated with a corresponding time stamp 96, and each event 92 may be associated with its corresponding event data 98. The event data 98 describes specific details, metadata, and other information regarding the event 92. The sequence 90 of the multiple events 92 (e.g., Event1, Event2, . . . EventN, where N is an integer value) represents the current context 40 associated with the cloud service 28.

FIG. 5 illustrates more examples of the contextual session 42. As the client device 32 interacts with the cloud service 28, and/or as the cloud service 28 is initiated and executed, the cloud computing environment 22 may send or forward the events 92 to the server 24 for analysis. Each event 92 is associated with the cloud service 28 provided on behalf of the client device 32 and/or the user identity 44. When the server 24 receives the events 92, the contextual session prediction application 52 may then cause or instruct the hardware processor 50 to generate the contextual session(s) 42 using the events 92. Each contextual session 42 may again be represented as the sequence 90 of the multiple events 92 occurring within the timeframe 94. In this example, the events 92 may include application programming interface (or API) calls 100 associated with the cloud service 28. The API calls 100 represent predefined functions, procedures, and features provided by the cloud service 28. Each API call 100 may be associated with its corresponding time stamp 96, and each API call 100 may also be associated with its corresponding descriptive event data 98. The cloud computing environment 22 may forward the API calls 100 to the server 24 for analysis. The cloud computing environment 22, instead, may forward all the events 92 to the server 24, and the contextual session prediction application 52 may instruct or cause the server 24 to perform an API filter operation 102 that filters out the API calls 100 from the events 92. The contextual session prediction application 52 may thus isolate the sequence 90 of the multiple API calls 100 associated with the cloud service 28.

The cloud service provider 30 may rely on the contextual session prediction service 48. When the cloud service 28 is provided, the cloud service provider 30 needs tools that identify the unusual or abnormal operation 80. Anomalous cloud behavior is often a precursor to identifying malicious behavior and cyber security threats/attacks. The contextual session prediction service 48 identifies and flags unusual contextual sessions 42 within the cloud computing environment 22. Conventional behavioral schemes merely monitor a single event 92, so these conventional behavioral schemes generate enormous numbers of false positive reports of malicious behavior. The contextual session prediction service 48, in contradistinction, monitors each user's contextual sessions 42. Because each user's cloud behavior is unique and variable, the contextual session prediction service 48 adapts to each user's usage patterns and behavior (as represented by their individualized contextual sessions 42). Moreover, because the contextual session prediction service 48 monitors each user's unique contextual sessions 42, the contextual session prediction service 48 captures each user's unique usage patterns and interconnections among the events 92 and their importance within the context 40.

Figure 6:
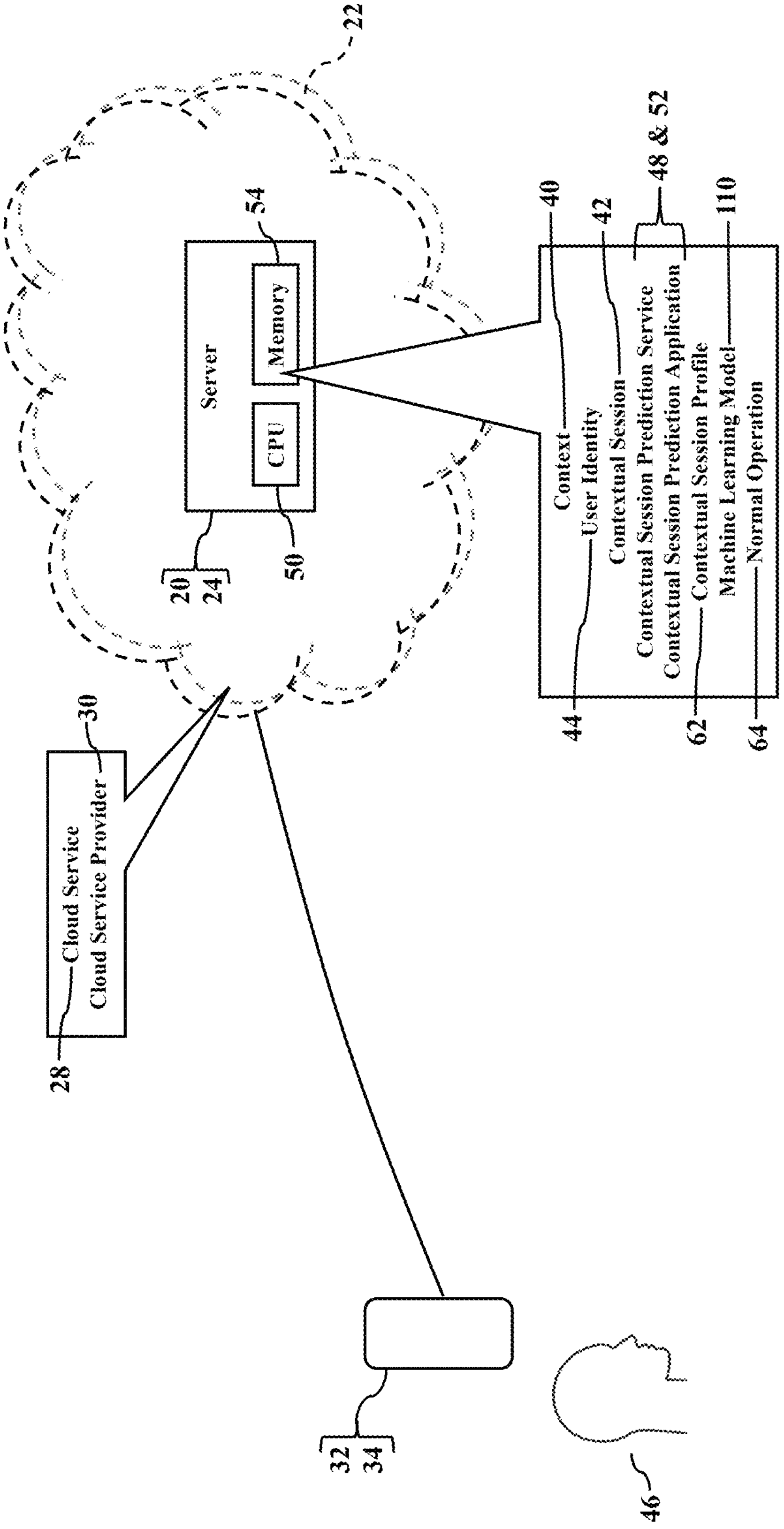
Figure 8:
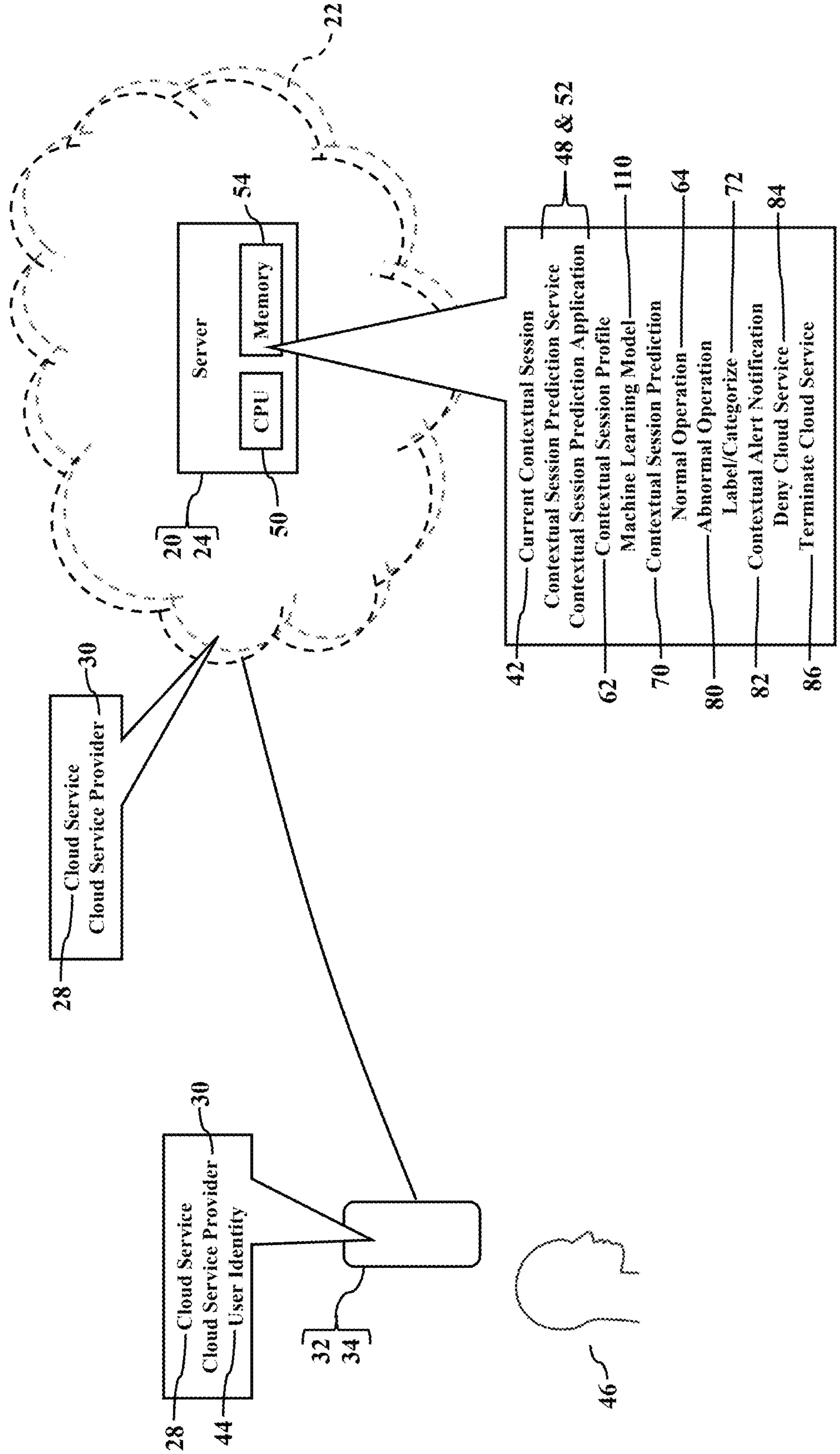

FIGS. 6-8 illustrate examples of machine learning. When the server 24 receives the contextual session 42, the server 24 executes the contextual session prediction application 52 as the predictor engine. The server 24 may ingest the contextual session 42 as an input, and the contextual session prediction application 52 instructs the server 24 to compare the contextual session 42 to the contextual session profile 62. In this example, the contextual session profile 62 is generated by a machine learning model 110. The machine learning model 110 may be a network resource or service provided by the cloud computing environment 22. The machine learning model 110 may also be resource or service provided by a contractor or third party service provider (not shown for simplicity). For simplicity, though, FIG. 6 illustrates the machine learning model 110 as a service, module, or function provided by the server 24. The server 24 may thus execute the machine learning model 110 to build the contextual session profile 62. The machine learning model 110 generates the contextual session profile 62 to statistically identify (e.g., $\pm 3\sigma$ standard deviations) the safe or normal operation 64. Because the machine learning model 110 builds the contextual session profile 62, the machine learning model 110 may statistically predict a range of the safe or normal operation 64, in terms of past/historical/habitual contextual sessions 42.

FIG. 7 illustrates more examples of the contextual session profile 62. The contextual session profile 62 may specify different, predetermined sequences 90 of the events 92 and/or the API calls 100, occurring within the same timeframe 94 or within different timeframes 94, that are predetermined to be the safe or normal operation 64. The contextual session profile 62, for example, may represent snippets or samples of contextual sessions 42 that have been assessed as the normal operation 64. The contextual session profile 62, in other words, may represent sample, time-based strings of the events 92 and/or the API calls 100 that have been pre-defined or pre-categorized as the safe operation 64. The contextual session profile 62, as another example, may represent user-specific, historical sequences 90 of the events 92 and/or the API calls 100, occurring within the same or different timeframes 94, that have been historically logged or observed when providing the cloud service 28 to the same user identity 44 and/or to the same client device 32. The contextual session profile 62, in other words, may represent personalized, historical contextual sessions 42 that have been learned/recorded over time. The contextual session profile 62 may thus describe the user's/device's time-based habitual usage that is observed or learned over time when providing the cloud service 28 to the same user identity 44 and/or to the same client device 32. The contextual session profile 62 may thus define or describe normal or expected process events 92, API calls 100, communications, activities, behaviors, data values, patterns, contextual login/location, or other electronic content, occurring within the timeframe(s) 94.

The machine learning model 110 may be trained. The cloud computing environment 22 may train the machine learning model 110 using the user-specific, historical contextual sessions 42 previously logged/observed and associated with the safe or normal operation 64. As a simple example, the machine learning model 110 may generate the contextual session profile 62 using Gaussian probability distributions based on contextual session training data 112 derived from different sequences 90 of the events 92, the API calls 100, and the timeframes 94 associated with the cloud service 28 and/or with the user identity 44. One or more standard deviations and confidence intervals may then be calculated to predict the sequences 90 over the timeframes 94 that represent the safe or normal operation 64. As the contextual session prediction application 52 inspects the current contextual session 42, statistical models may be used to predict that the current contextual session 42 conforms to, matches, or deviates from the contextual session profile 62.

As FIG. 8 illustrates, the server 24 may generate the contextual session prediction 70. When the current contextual session 42 conforms to the contextual session profile 62, the contextual session prediction application 52 may thus instruct the server 24 to determine the contextual session 42 is the safe or normal operation 64. The server 24 may thus generate the contextual session prediction 70 as an output, and the contextual session prediction 70 determines, or predicts, that the contextual session 42 is the safe or normal operation 64. In simple words, because the current contextual session 42 (such as the sequence 90 of the events 92 and/or the API calls 100 illustrated in FIGS. 4-5 & 7) sufficiently matches some historical contextual session 42 previously logged or observed, the contextual session prediction application 52 may instruct the server 24 to label, sort, or classify the current contextual session 42 as the normal operation 64. The current contextual session 42 may further be labeled, sorted, or classified as benign, low priority, and/or not requiring further investigation.

The server 24, however, may predict the abnormal operation 80. When the current contextual session 42 fails to conform to the contextual session profile 62 (perhaps generated by the machine learning model 110), then the contextual session prediction application 52 may determine that the current contextual session 42 is the abnormal operation 80. The current contextual session 42, for example, may represent an unknown sequence 90 of the events 92 and/or the API calls 100 not historically logged or observed. The current contextual session 42, as another example, may represent events 92, API calls 100, and/or timings that statistically lie outside the contextual session profile 62. The current contextual session 42, as yet another example, may represent a matching or similar sequence 90 of the events 92 and/or the API calls 100, but the timeframe 94 does not sufficiently match or lie within the historical timeframes 94 specified by the contextual session profile 62. Any mismatch or deviation from the contextual session profile 62 may determine the abnormal operation 80. Because the current contextual session 42 fails to conform to the contextual session profile 62, the contextual session prediction application 52 may further label or categorize 72 the contextual session 42 as the abnormal operation 80. The contextual session prediction application 52 may generate and send the contextual alert notification 82 indicating the contextual session 42 represents the abnormal operation 80. As more examples, the contextual session prediction application 52 may deny 84 and/or the terminate 86 the cloud service 28.

The contextual session prediction service 48 may be unsupervised. When the machine learning model 110 generates the contextual session profile 62, the contextual session prediction service 48 may be autonomously executed within the cloud computing environment 22. The contextual session prediction service 48 identifies anomalous contextual sessions 42 in the context 40 of each user's normal operation 64 and/or abnormal operation 80. The contextual session prediction service 48 may extract session-level features (as later paragraphs will explain) from the contextual sessions 42. The contextual session prediction service 48 may use the session-level features as the contextual session training data 112 (illustrated in FIG. 7) for the machine learning model 110. The contextual session prediction service 48 may thus employ contextual session-level anomaly detection to contextualize and to better understand each user's device behavior over the sequence 90 of the events 92, the API calls 100, and/or the electronic data 46. The contextual session prediction service 48 holistically monitors the sequence 90, rather than solely focusing on individual events in isolation as conventional schemes. Indeed, the contextual session prediction service 48 may even monitor the contextual sessions 42 associated with a group of users and determine their individual and/or group normal operation 64 and abnormal operation 80. The contextual session prediction service 48, in simple words, identifies the contextual session(s) 42 that is/are statistically different from habitual/historical contextual sessions 42.

Computer functioning is greatly improved. Conventional anomaly-detection schemes utilize inflexible, rule-based detections. Rules-based approaches cannot contextualize normal verses abnormal behavior for each individual user. The conventional anomaly-detection schemes focus on single event-level information, which is very inaccurate and results in high false-positive rates. The contextual session prediction service 48, instead, causes the computer system 20 (such as the server 24) to monitor the sequence 90 of the multiple events 92 and/or the multiple API calls 100. The computer system 20 aggregates the event data 98 to the contextual session level per user 46. The computer system 20, and/or the cloud computing environment 22, may use the machine learning model 110 to find anomalous contextual sessions 42 as granular as the individual user level. By aggregating the events 92 into the time-based contextual session 42, the computer system 20 encodes time-based statistics and information that can be used by the machine learning model 110. The computer system 20 thus reveals the intricate interconnections of the events 92 and/or the API calls 100 over time. The computer system 20 thus more accurately identifies each user's unique and individualized usage patterns based on the user's contextual sessions 42. The computer system 20 more accurately identifies the normal operation 64 and the abnormal operation 80. The computer system 20 thus more accurately identifies the abnormal operation 80, meaning malicious usage is more quickly identified and resolved. The computer system 20 protects the cloud service 28, the cloud computing environment 22, and/or the client device 32 from cyber threats.

Figure 9:
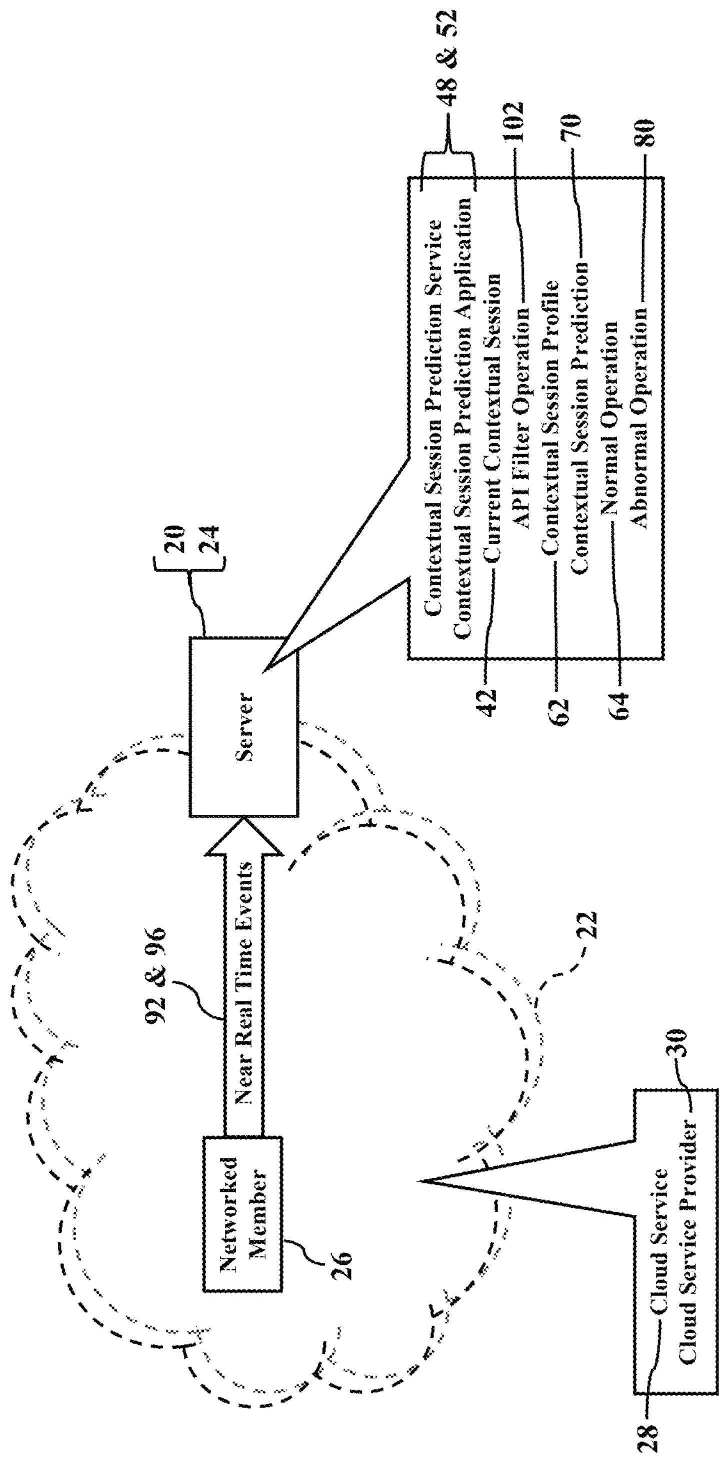
FIGS. 9-10 illustrate examples of event sourcing.
Figure 10:
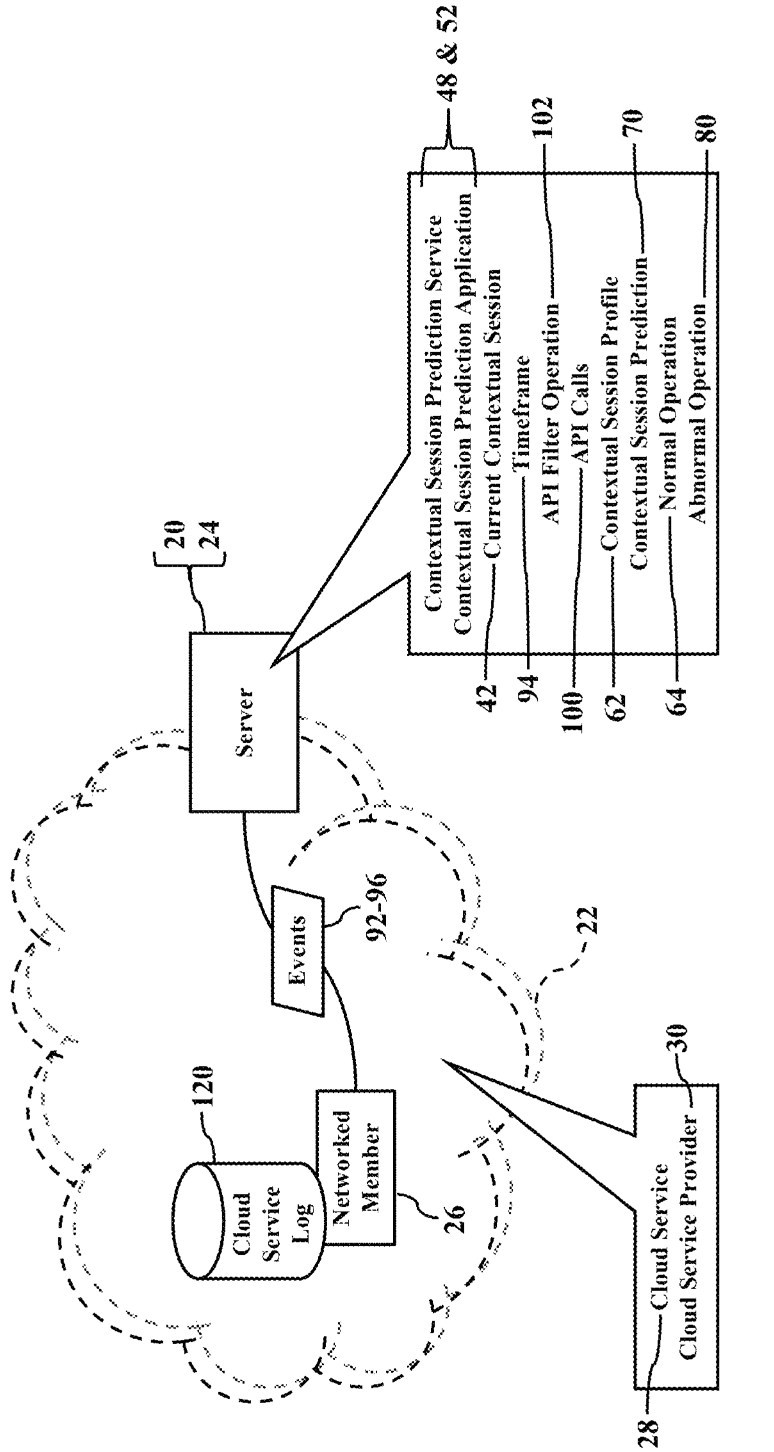

FIGS. 9-10 illustrate examples of event sourcing. As the cloud computing environment 22 provides the cloud service 28, the cloud computing environment 22 may also provide the events 92 to the computer system 20 (such as the server 24) for monitoring and analysis. FIG. 9, for example, illustrates real time, or near real time, event ingestion. That is, as the cloud computing environment 22 provides the cloud service 28, any networked member 26 of the cloud computing environment 22 may forward the events 92 to the network address (e.g., IP address) associated with the server 24. The server 24 may thus receive the events 92 as a real time, or near real time, monitoring input. When the server 24 receives the events 92, the contextual session prediction application 52 may cause or instruct the server 24 to identify only those events 92 of interest. The contextual session prediction application 52, for example, may execute the API filter operation 102 to identity the API calls 100. Other filter operations may be executed to identify other specific events 92 of interest. Whatever the events 92 of interest, because each event 92 is associated with its corresponding time stamp 96 (perhaps according to a common reference or start time), the contextual session prediction application 52 may cause or instruct the server 24 to sequentially arrange the events 92 according to the timeframe 94. The contextual session prediction application 52 may thus determine the different contextual sessions 42 according to different timeframes 94.

Contextual session profiling may be performed. The server 24 may compare the contextual session 42 to the contextual session profile 62 and generate the contextual session prediction 70 as an output. If the contextual session prediction application 52 determines that the contextual session 42 represents the safe or normal operation 64, then the contextual session prediction application 52 may approve, authorize, or allow the cloud service 28, again perhaps in real time or near real time. If, however, the contextual session prediction application 52 determines that the contextual session 42 represents the abnormal operation 80, then the contextual session prediction application 52 may generate and send the contextual alert notification 82 to any IP address (as previously explained with reference to FIGS. 3 & 8). The contextual session prediction application 52 may thus hand-off the contextual session 42 to other systems, teams, groups, and/or networked members 26 for a deeper or more sophisticated analysis. The contextual session prediction application 52 may even have authority to delay the cloud service 28 pending further investigation. The contextual session prediction application 52 may also have authority to even deny 84 and/or terminate 86 the cloud service 28, again perhaps in real time or near real time (as previously explained with reference to FIGS. 3 & 8). The contextual session prediction application 52 thus monitors the cloud service 28 and detects an abnormal/anomalous contextual session 42 perhaps representing a potential cyber security threat or attack.

FIG. 10 illustrates cloud logging. As the cloud computing environment 22 provides the cloud service 28, the cloud computing environment 22 may log and store the events 92 associated with the cloud service 28. While any data logging scheme may be used, FIG. 10 illustrates a cloud service log 120. The cloud service log 120 may be a network database resource that stores the events 92 and their corresponding time stamps 96. The cloud computing environment 22 may thus make the cloud service log 120 available to other devices and services. The contextual session prediction application 52, for example, may cause or instruct the server 24 to query the cloud service log 120 and to retrieve any database entries associated with the events 92, perhaps logged within a window of time. By retrieving the events 92 and their corresponding time stamps 96, for example, the contextual session prediction application 52 may identify one or more of the sequences 90 occurring over any timeframe 94. The contextual session prediction application 52, as another example, may instruct the server 24 to perform the API filter operation 102 and filter out the API calls 100 of interest. Other filter operations may be executed to identify other specific events 92 of interest. Whatever the events 92 of interest, because each event 92 is associated with its corresponding time stamp 96 (perhaps according to a common reference or start time), the contextual session prediction application 52 may cause or instruct the server 24 to sequentially arrange the events 92 according to the timeframe 94. The contextual session prediction application 52 may thus determine the different contextual sessions 42 according to different timeframes 94. The contextual session prediction application 52 may thus isolate the desired contextual sessions 42 occurring within any desired timeframe 94.

FIGS. 11-14 illustrate examples of the contextual session training data 112. As this disclosure above explained, the contextual session prediction service 48 extracts session-level features (illustrated as reference numeral 130) that best represent the contextual sessions 42 (illustrated in FIG. 1-10). While the session-level features 130 may be retrieved from any network source or service, for simplicity, FIG. 11 illustrates the cloud service log 120. The cloud service log 120, as previously explained, records the events 92 associated with the cloud service 28. For simplicity, the cloud service log 120 also records the corresponding event data 98. In other examples, though, the event data 98 may be separately stored and retrieved. Moreover, while any cloud service log 120 may be used as event source data, initial experiments used Amazon's AWS CLOUDTRAIL® service that logs actions taken by the user's client device 32 (illustrated in FIGS. 1-8) and any AWS cloud service 28 as the events 92. The initial experiments detected anomalies in the AWS CLOUDTRAIL® data. The AWS usage pattern is unique for each user 46 (illustrated in FIGS. 2-8), depending on roles, responsibilities, and intentions. What may be typical for one user 46 can appear anomalous when observed in another user's context 40. As each user's AWS account usage activity varies significantly, the contextual session prediction service 48 understands and adapts to the unique behavior of each user 46. Individually, each individual event 92 within AWS CloudTrail® logs, in isolation, might appear normal. The larger/longer sequence 90 of events 92, though, may be indicative of malicious intent. The contextual session prediction service 48 overcome this contextual complexity and captures how the events 92 are connected and their importance in the context 40.

FIGS. 12-14 illustrate more examples of the extracted session-level features 130. While any event data 98 may be extracted, FIG. 12 illustrates the session-level features 130 that are currently thought to best represent the contextual sessions 42. These session-level features 130 represent information related to API usage patterns, IP addresses, cloud region, user agent, and errors-related patterns in any contextual session 42. These session-level features 130 account for the user behavior variability observed in any cloud service log 120 (such as AWS CLOUDTRAIL® data). These session-level features 130 may be used to detect anomalous, abnormal operation 80 at the user level. The initial experiments narrowed the focus to detecting anomalous, abnormal operation 80 for a particular user 46, identified as "X" from dataset #1 (illustrated in FIG. 13) and identified as "Level6" from dataset #2 (illustrated in FIG. 14), which is an AWS Identity and Access Management® service subscriber (or IAMUser). Further, the initial experiments were limited to the events 92 (eventSource) related to IAM and to Amazon's Elastic Compute Cloud® (or EC2) service, which are critical services in AWS® environments. By concentrating on IAM and EC2 events 92, the initial experiments aimed to identify anomalous, abnormal operation 80 within the scope of interactions with AWS® resources. These events encompass activities such as user authentication, permission change, resource provisioning, and other critical tasks in AWS®. To tackle contextual complexity, the events 92 were sequentially aggregated within the timeframe 94 as the contextual session 42 (such as the API calls 100 made within the timeframe 94). This session-level anomaly detection contextualizes and better understands the user's behavior over the sequence 90 of related events 92, rather than solely focusing on individual events in isolation. Given the contextual sessions 42 for any user 46, the contextual session profile 62 may be used to identify other contextual sessions 42 that are significantly/statistically different.

Figure 15:
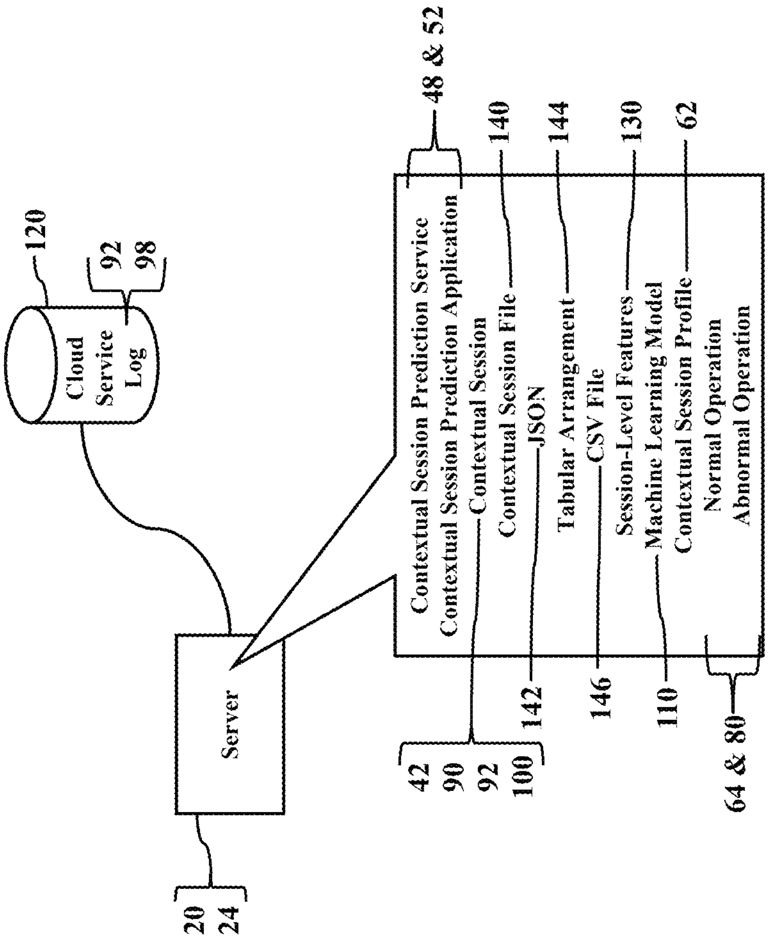
FIGS. 15-16 illustrate examples of session-level feature processing.
Figure 16:
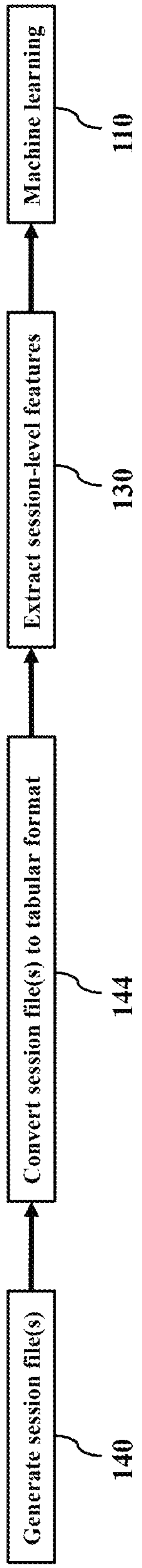

FIGS. 15-16 illustrate more examples of session-level feature processing. Data from the cloud service log 120 (such as AWS CLOUDTRAIL® data) may be used to generate one or more contextual session files 140. Each contextual session 42 may be represented by its corresponding contextual session file 140. The contextual session file 140, for example, has data representing the sequence 90 of the events 92 and/or the API calls 100 associated with the corresponding contextual session 42. While the session files 140 may have any file formatting, in the initial experiments, each session file 140 is formatted according to the JAVASCRIPT OBJECT NOTATION® (or JSON) standard 142. The JSON-formatted session files 140 may then be parsed and merged or combined into a tabular arrangement or format 144. The tabular arrangement 144 allows the AWS CLOUDTRAIL® data to be easily visualized and sorted/searched/arranged for ease of use. While any tabular arrangement 144 may be used, the initial experiments converted the session files 140 into a single, tabular comma-separated values (or CSV) file 146.

Operations for feature extraction may be performed. The session-level features 130 may be extracted from the CSV file 146. Now that the sequence 90 of the events 92 and/or API calls 100 has the tabular arrangement 144, the contextual session prediction service 48 may quickly identify and extract any data entries representing any desired session-level feature(s) 130. The contextual session prediction application 52 may merely perform data lookups to sort/filter/retrieve entries/features of interest. Returning to FIG. 12, for example, some of the key session-level features 130 are illustrated that may be identified and extracted. These session-level features 130 represent the essence of each contextual session 42. These session-level features 130 may play a pivotal role in understanding and analyzing behavior of contextual sessions 42 within a user's dataset.

Different, unsupervised machine learning models 110 were then tested and evaluated. Once the desired session-level features 130 are determined, machine learning may be applied. While any machine learning model 130 or technique may be used, the initial experiments evaluated machine learning models 110 implementing the k-means, HBDSCAN, and Isolation Forest techniques. These machine learning models 110 were trained using the extracted session-level features 130. The Isolation Forest algorithm, in particular, generates an anomaly score for each contextual session 42 and, based on chosen threshold, any contextual sessions 42 are identified as the normal operation 62 or as the anomalous/abnormal operation 80. This session-level Isolation Forest approach is flexible, where the machine learning model 110 can be built and applied to an individual user level 46 and/or to a group of similar users. In the initial testing using the AWS CLOUDTRAIL® logs, Isolation Forest effectively identifies anomalous events 92 of interest while maintaining a low false-positive rate relative to other tested anomaly detection approaches.

Figure 17:
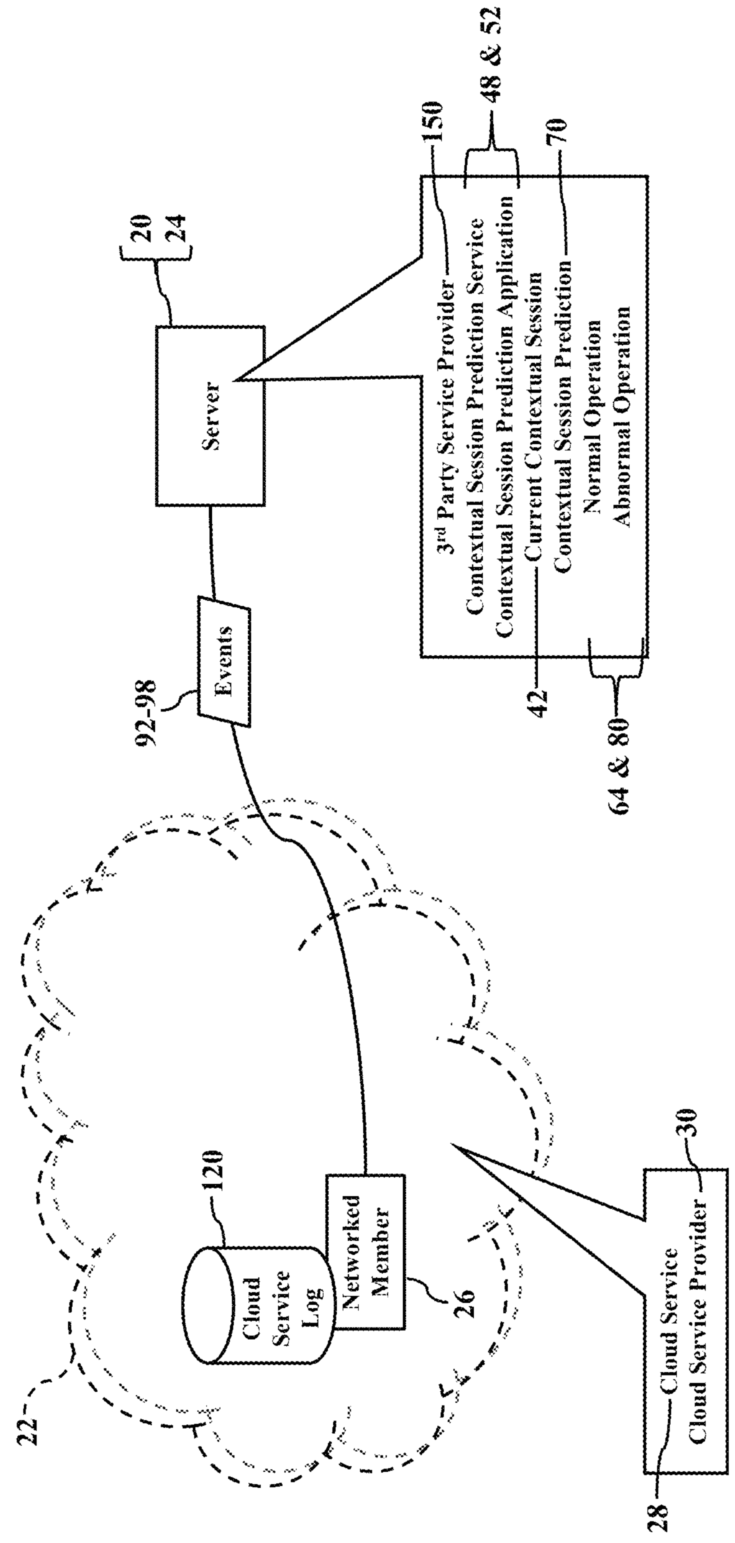
FIG. 17 illustrates examples of third party servicing.

FIG. 17 illustrates examples of third party servicing. Here the contextual session prediction service 48 may be offered or provided by a third party contractor or service provider 150. The cloud computing environment 22 may thus hand off or subcontract the contextual session prediction service 48 to the third party service provider 150. The third party contractor or service provider 150 is given access to the events 92, the time stamps 96, and/or the event data 98 associated with the cloud service 28 provided by the cloud computing environment 22. As FIG. 17 illustrates, suppose the third party contractor or service provider 150 operates the computer system 20 (e.g., the server 24). The server 24 is authorized to query the cloud service log 120 and retrieve the events 92, the time stamps 96, and/or the event data 98 associated with the cloud service 28. The server 24 executes the contextual session prediction application 52 and provides the contextual session prediction service 48. The server 24 thus monitors the contextual sessions 42 and generates a service result (such as the contextual session prediction 70 predicting either the normal operation 64 or the abnormal operation 80). The server 24 may then send the service result (such as the contextual session prediction 70) to the cloud computing environment 22 providing the cloud service 28.

Figure 18:
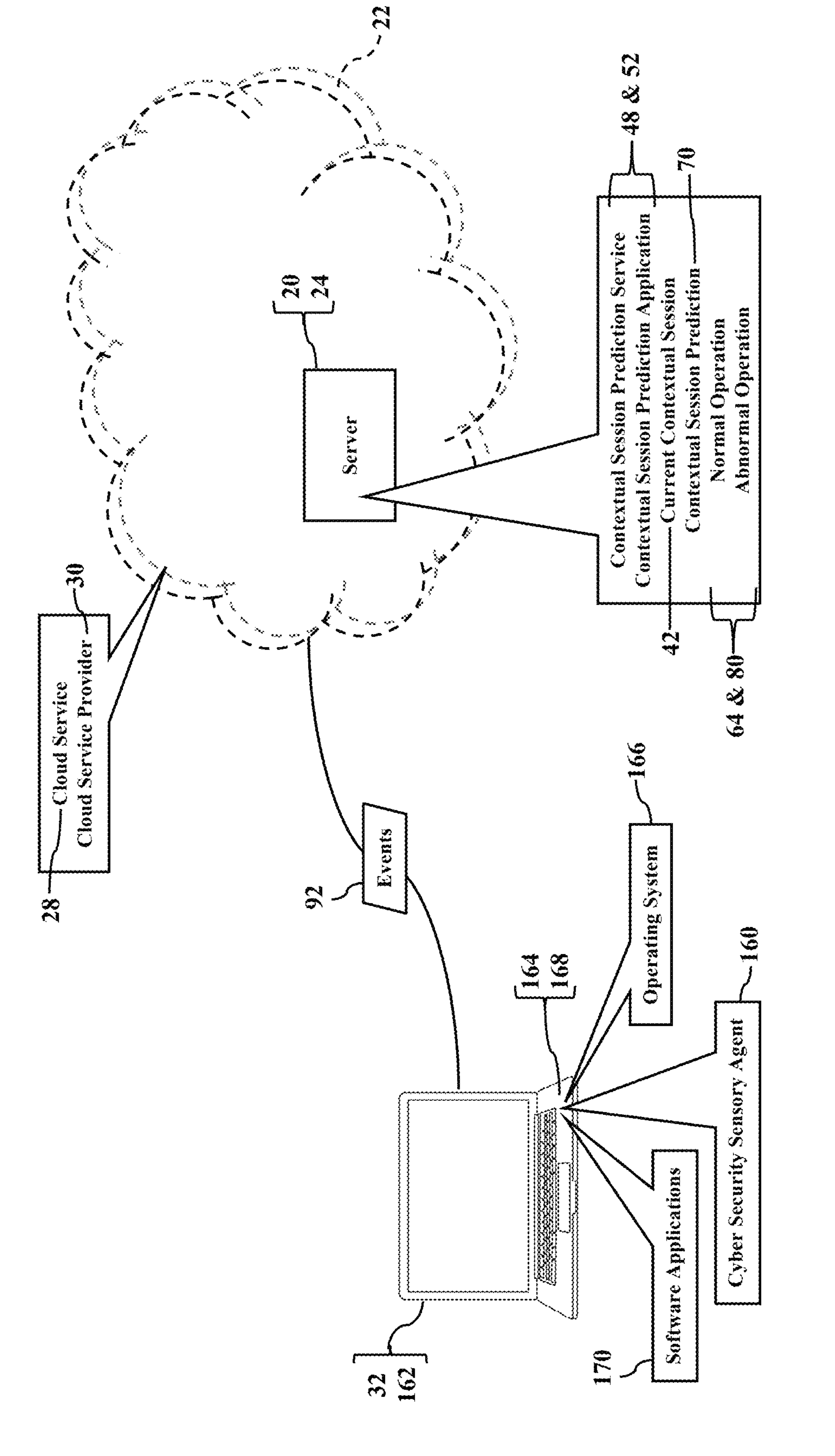
FIG. 18 illustrates examples of endpoint cooperation.

FIG. 18 illustrates examples of endpoint cooperation. Here a cyber security sensory agent 160 may cooperate with the cloud computing environment 22 to provide the contextual session prediction service 48. The client device 32 (illustrated as a laptop computer 162) has a hardware processor 164 that executes an operating system 166 stored in a local memory device 168. The laptop computer 160 stores many software applications 170 that are executed by the hardware processor 162. As the hardware processor 162 executes the software applications 170, any of the software applications 170 may attempt to maliciously interact with the cloud computing environment 22 providing the cloud service 28.

The laptop computer 160 may thus store and execute the cyber security sensory agent 160. The cyber security sensory agent 160 is a software program that monitors the laptop computer 162 for evidence of the abnormal operation 80. The cyber security sensory agent 160, for example, cooperates with the operating system 166 and with the cloud computing environment 22 to detect any abnormal operation 80 indicating a cyber threat. The operating system 166 notifies the cyber security sensory agent 160 of the events 92 requested by the locally-stored software applications 170. The cyber security sensory agent 160 may then send or upload the events 92 to the cloud computing environment 22. The cyber security sensory agent 160 and the cloud computing environment 22 may thus cooperate to provide the contextual session prediction service 48. If the normal operation 64 is predicted, then perhaps the cloud computing environment 22 provides the cloud service 28. If, however, the abnormal operation 80 is predicted, the cloud computing environment 22 may deny 84 or terminate 86 the cloud service 28 (as explained with reference to FIGS. 3 & 8). The cloud computing environment 22 and/or the cyber security sensory agent 160 may also cause the software application 170 to terminate.

Figure 19:
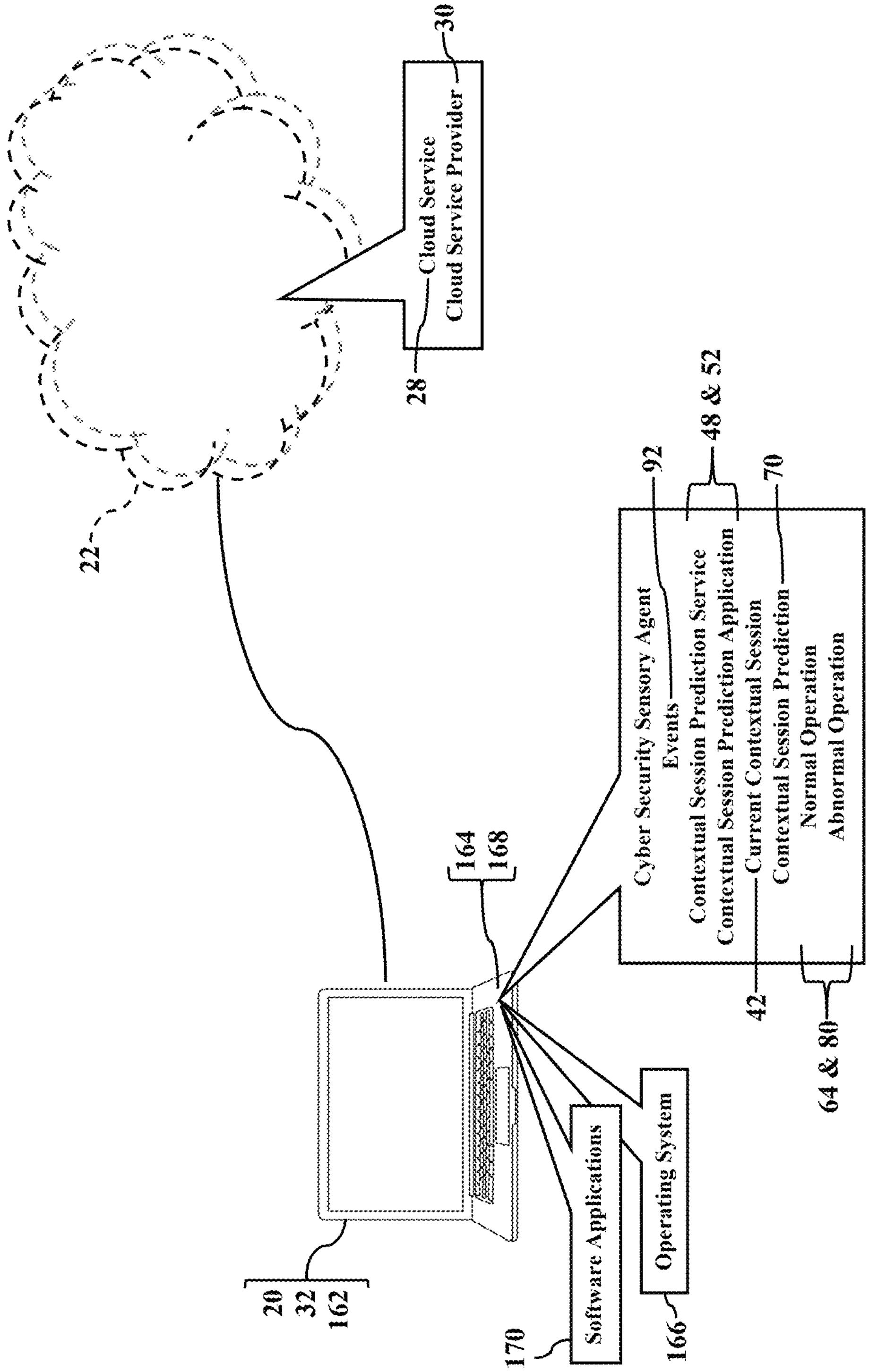
FIG. 19 illustrates examples of local endpoint prediction.

FIG. 19 illustrates examples of local endpoint prediction. Here the cyber security sensory agent 160 may also provide the contextual session prediction service 48. The cyber security sensory agent 160 may locally monitor any computer system 20 (such as the client device 32 again illustrated as the laptop computer 162) for any malicious contextual sessions 42 that may potentially harm the laptop computer 160 and/or the cloud computing environment 22 providing the cloud service 26. The cyber security sensory agent 160 is a software program that monitors the laptop computer 162 for evidence of the abnormal operation 80. The cyber security sensory agent 160, for example, cooperates with the operating system 166 to detect any abnormal operation 80 indicating a cyber threat. The operating system 166 notifies the cyber security sensory agent 160 of the events 92 requested by the locally-stored software applications 170. The cyber security sensory agent 160 may then generate the contextual session(s) 72 using the events 92. The cyber security sensory agent 160 may then provide the contextual session prediction service 48. If the normal operation 64 is predicted, then perhaps the cyber security sensory agent 160 notifies the cloud computing environment 22 and recommends or authorizes the cloud service 28. If, however, the abnormal operation 80 is predicted, the cyber security sensory agent 160 notifies the cloud computing environment 22 and may recommend or authorize denial 84 or termination 86 of the cloud service 28 (as explained with reference to FIGS. 3 & 8). The cyber security sensory agent 160 may also cause the software application 170 to terminate.

The cyber security sensory agent 160 may be an antimalware driver. The cyber security sensory agent 160, for example, may have kernel-level components having kernel-level permissions to a kernel of the operating system 166. The cyber security sensory agent 160 may additionally have user-mode components having user-level permissions to a user mode of the operating system 166. The cyber security sensory agent 160 may include computer program, code, or instructions that scan and monitor the laptop computer 162 for the events 92, communications, processes, activities, behaviors, data values, usernames/logins, locations, contexts, and/or patterns that indicate evidence of a cyber security attack. Because the cyber security sensory agent 160 has kernel-level permissions, the cyber security sensory agent 160 may monitor any kernel-level activity and/or any user-mode activity conducted by the laptop computer 162. The cyber security sensory agent 160 may register for and receive kernel-level notifications and call backs from the kernel.

Figure 20:
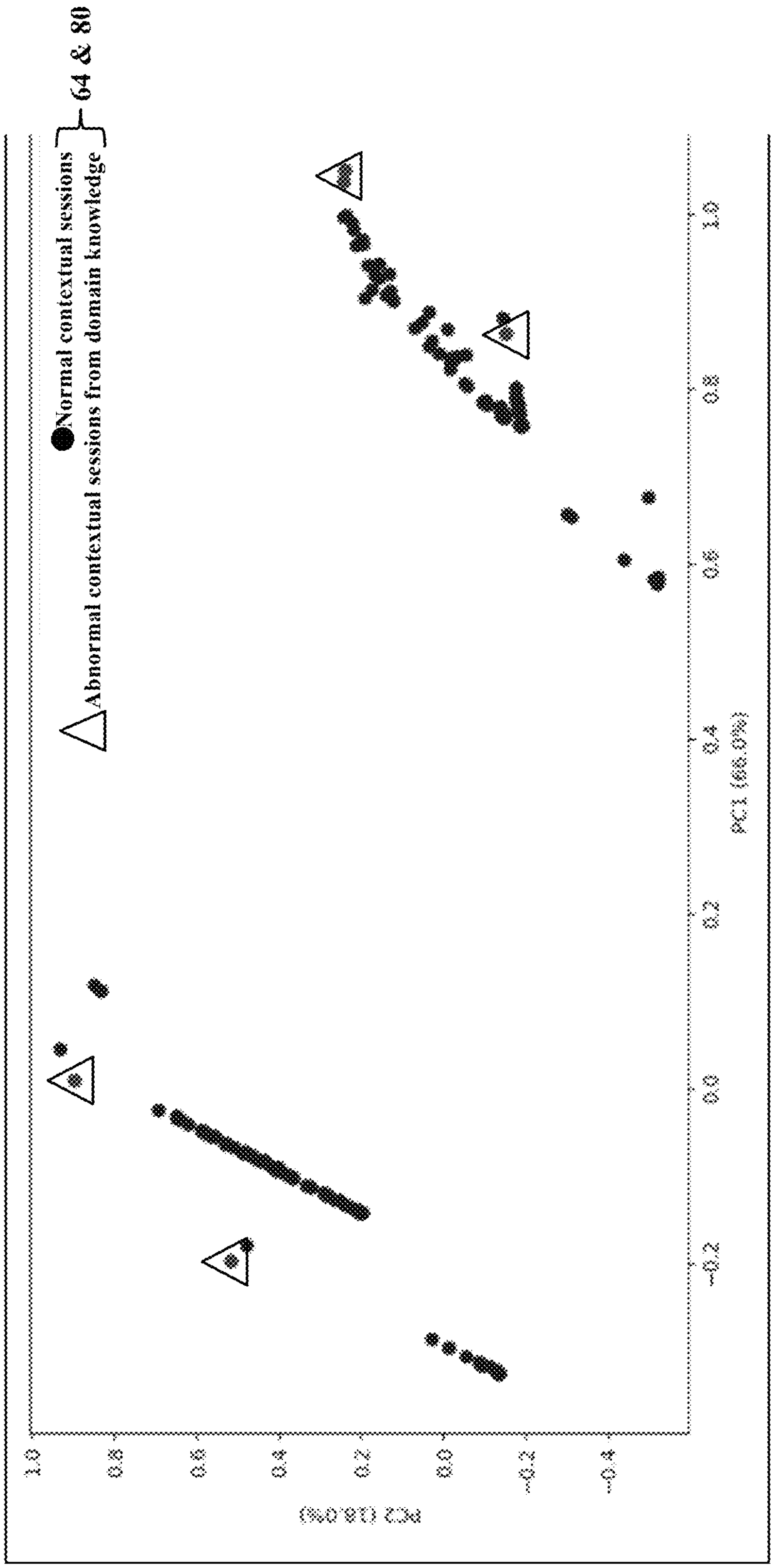
Figure 21:
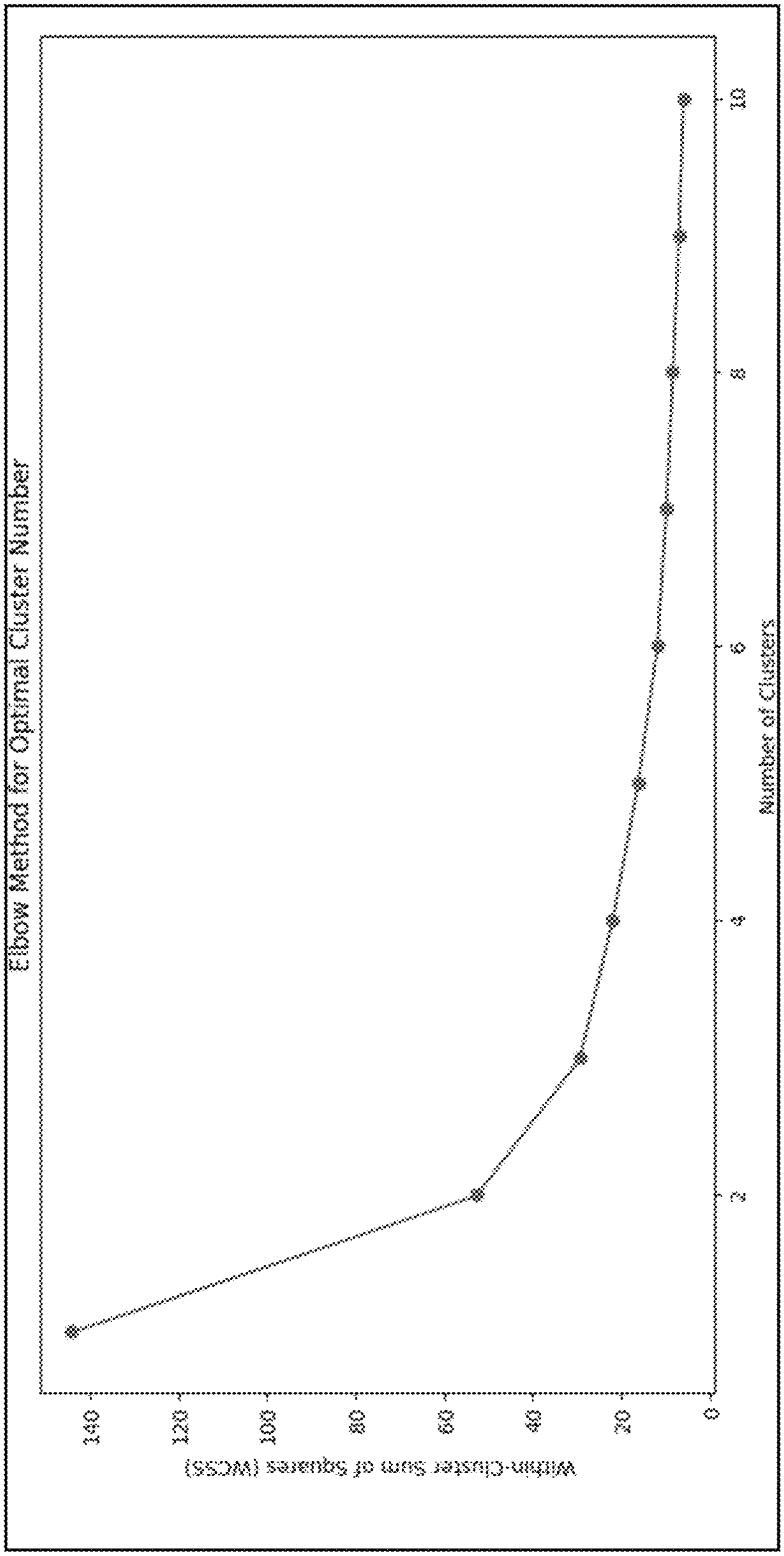
Figure 22:
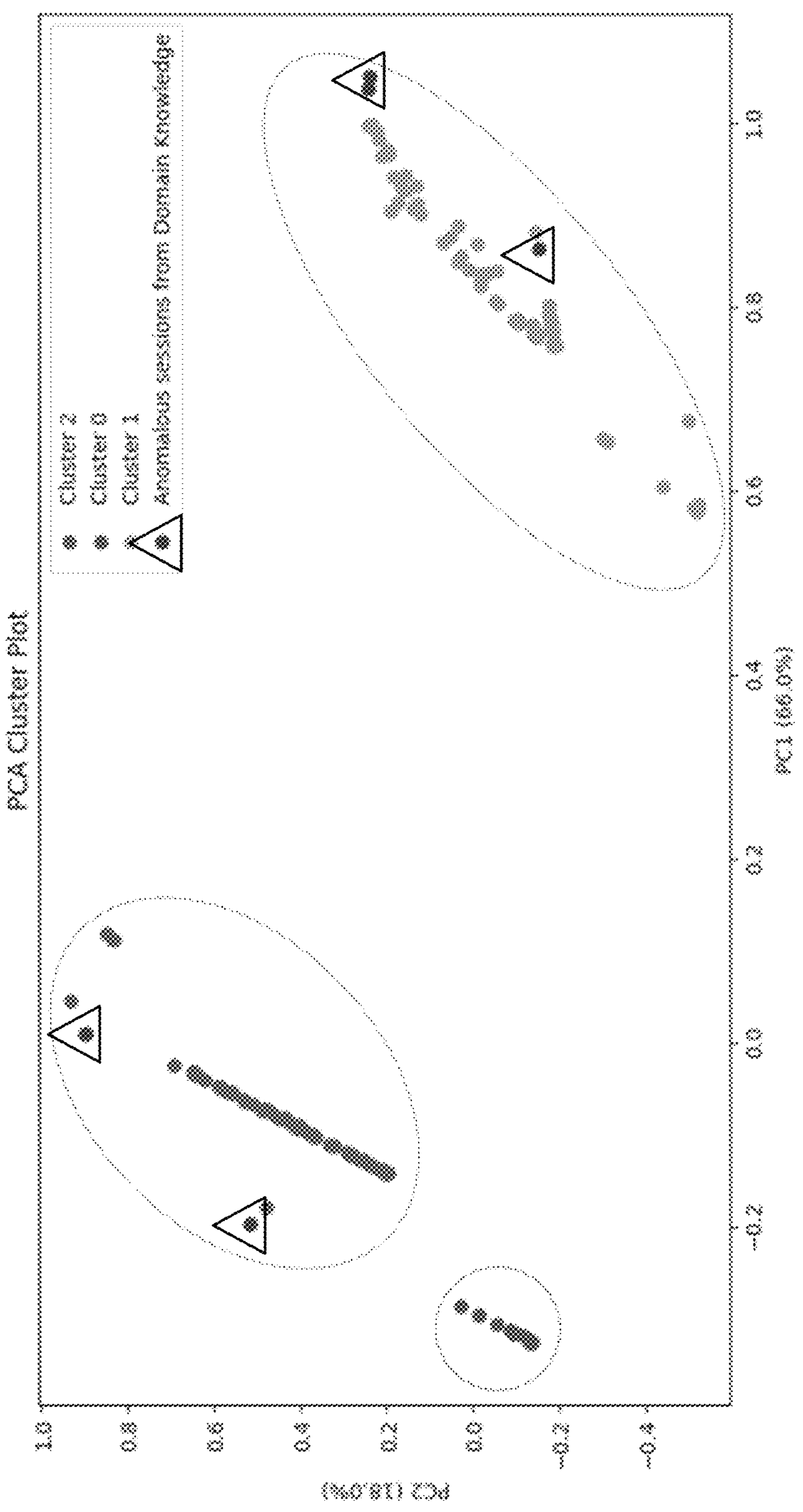
Figure 23:
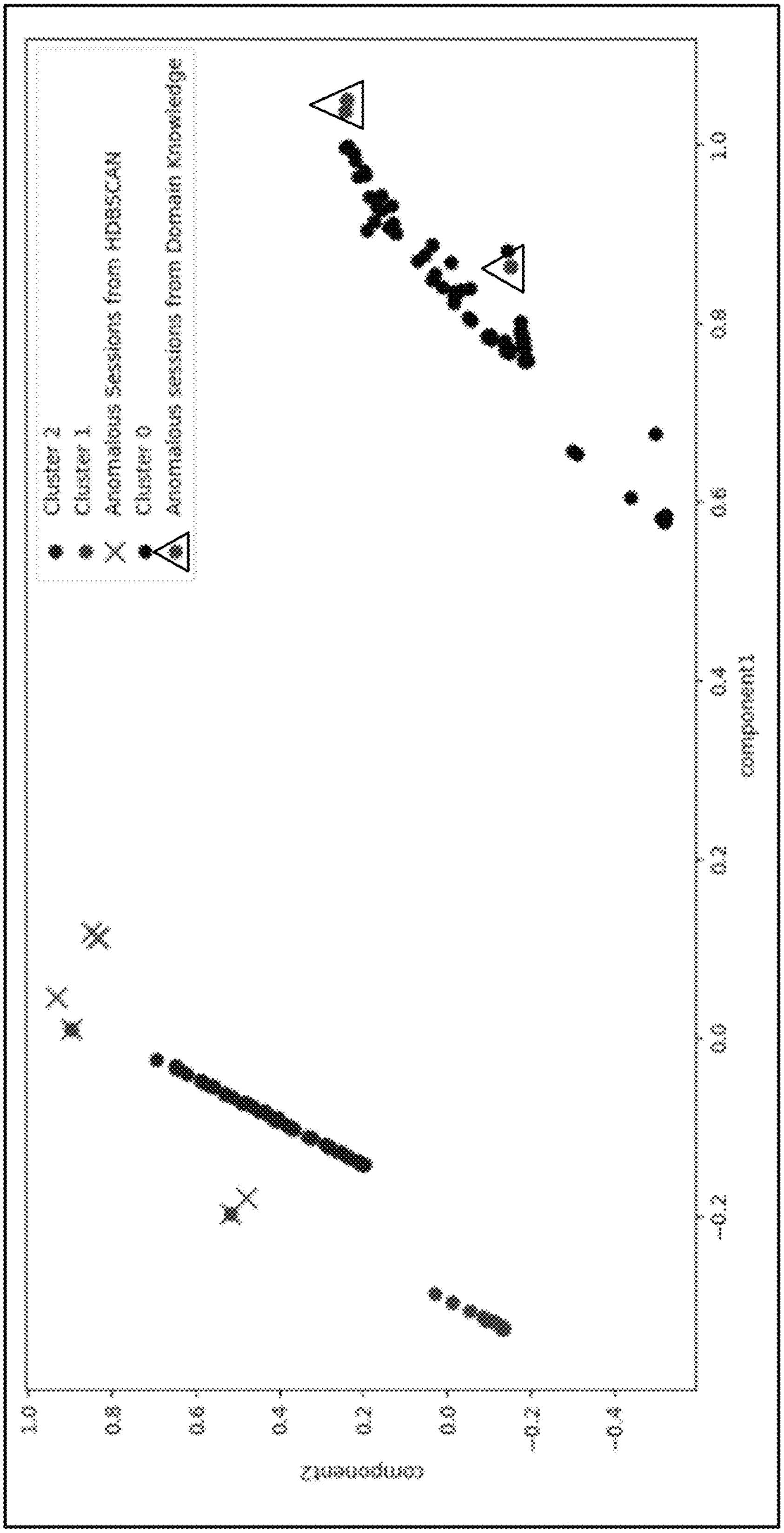
Figure 24:
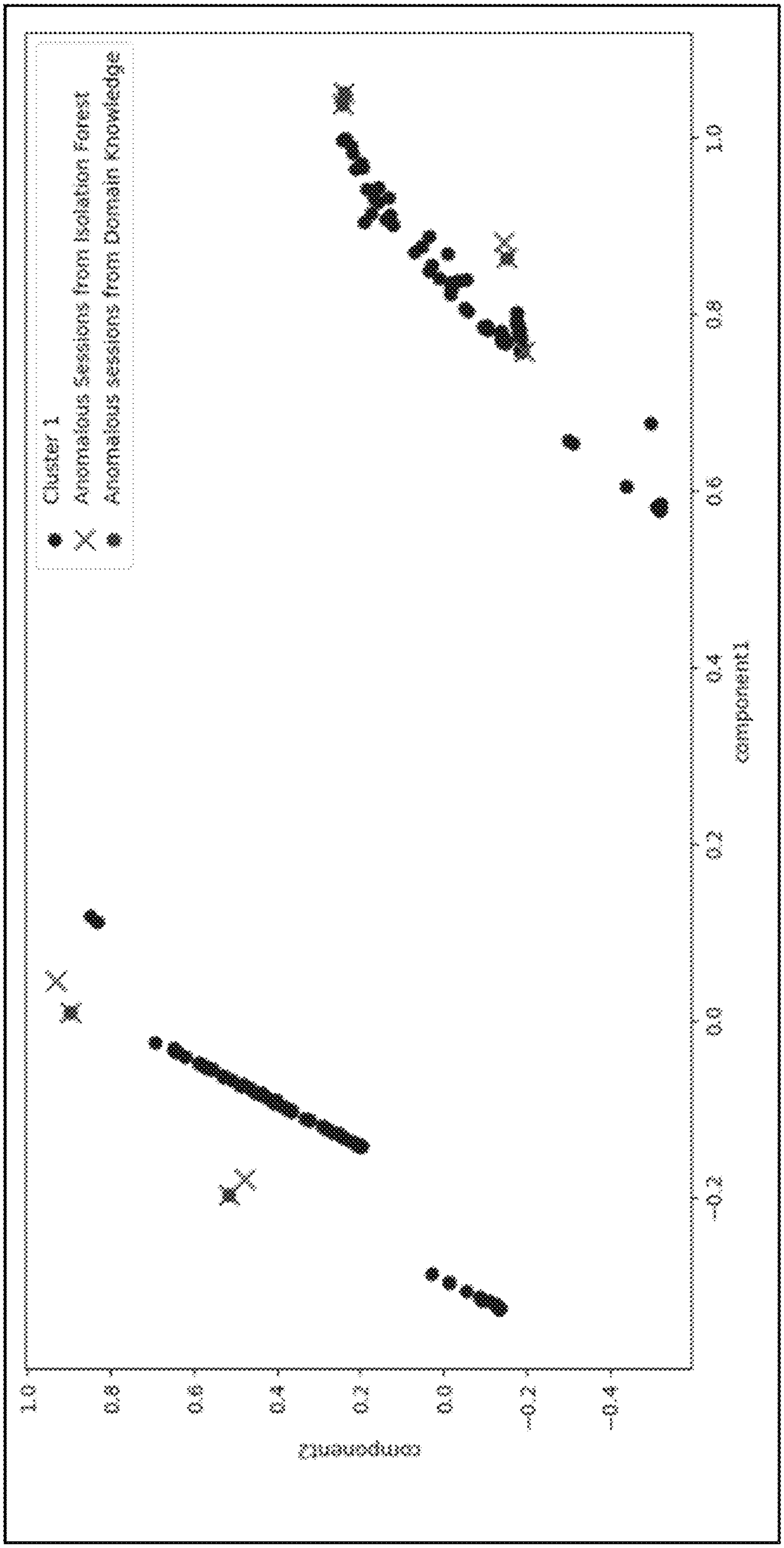
Figure 25:
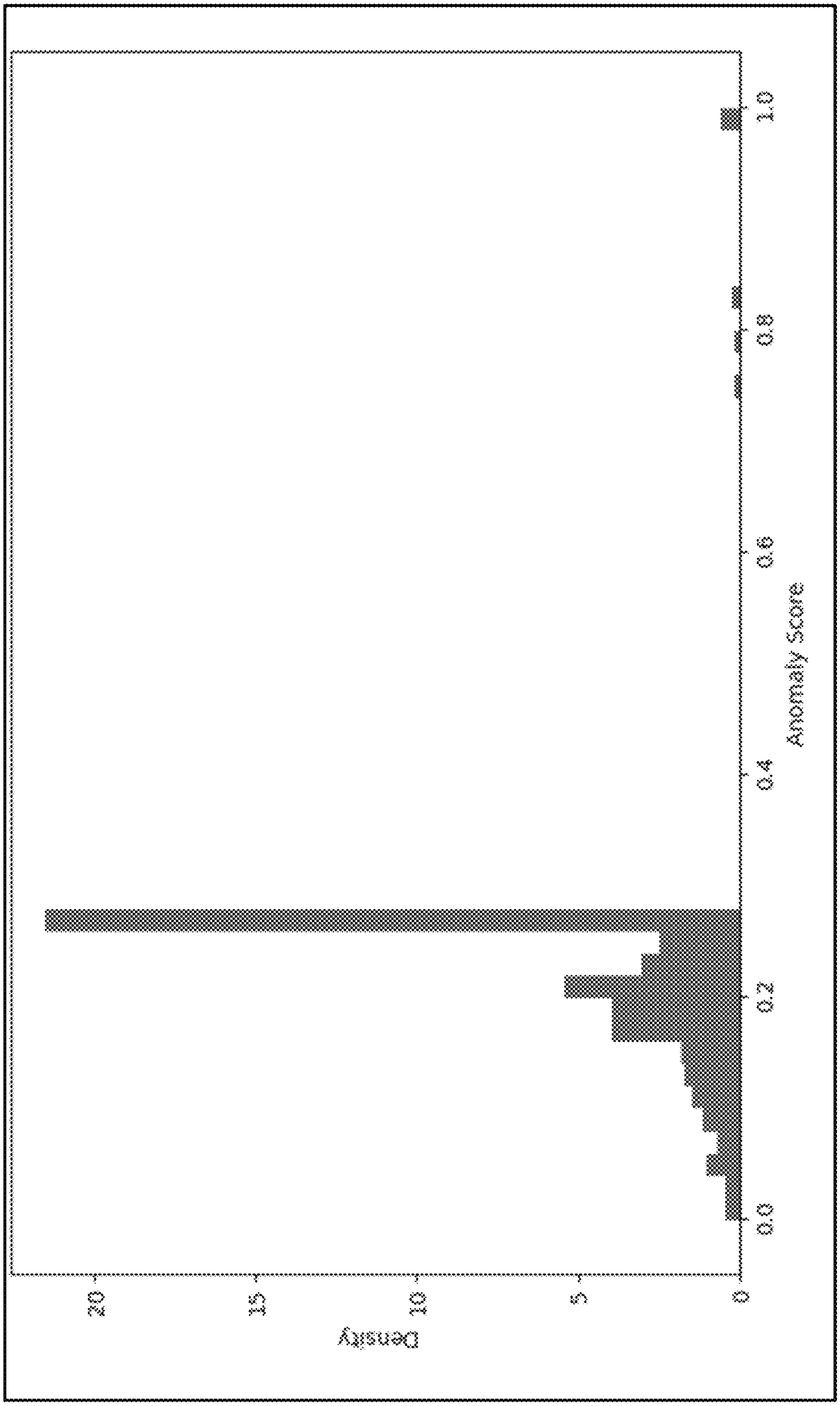

FIGS. 20-25 illustrate experimental results using dataset #1 (explained with reference to FIG. 13). As this disclosure above explained, the initial experiments used the AWS CLOUDTRAIL® logs and evaluated different machine learning models 110 (k-means, HBDSCAN, and Isolation Forest). The feature set data (e.g., the session-level features 130) includes all numerical features but at different scales. The feature set data is thus first normalized using MinMaxScaler( ) function. FIG. 20, for example, illustrates a graphical illustration of the contextual sessions 42 generated from dataset #1 (illustrated in FIG. 13) by applying a principal components analysis (or PCA). The contextual sessions 42 predicted to be the abnormal operation 80 are located in PCA space. FIG. 21 illustrates k-means clustering using the dataset #1. The elbow method was used to find an optimal number of clusters on running k-means technique in scaled feature data. FIG. 22 illustrates a k-means clustering using PCA visualization. After performing clustering using n_cluster=3, the clustering results were visualized using 2D PCA visualization. Anomalous contextual sessions 42 are captured by Cluster 1 and Cluster 2. The k-means technique does not do good job in clustering anomalous contextual sessions 42 as sessions are distributed in elongated curve as shown. FIG. 23 illustrates HDBSCAN clustering using PCA visualization. The HDBSCAN captured 2 out of 5 contextual sessions 42 of interest. Also, unlike k-means, the number of clusters need not be specified early hand. However, the hyperparameter needs to be tuned for each user 46. FIGS. 24-25 illustrate an Isolation Forest PCA visualization. The number of trees=150, and contamination=0.02. The Isolation Forest technique captures all contextual sessions 42 of interest.

Figure 26:
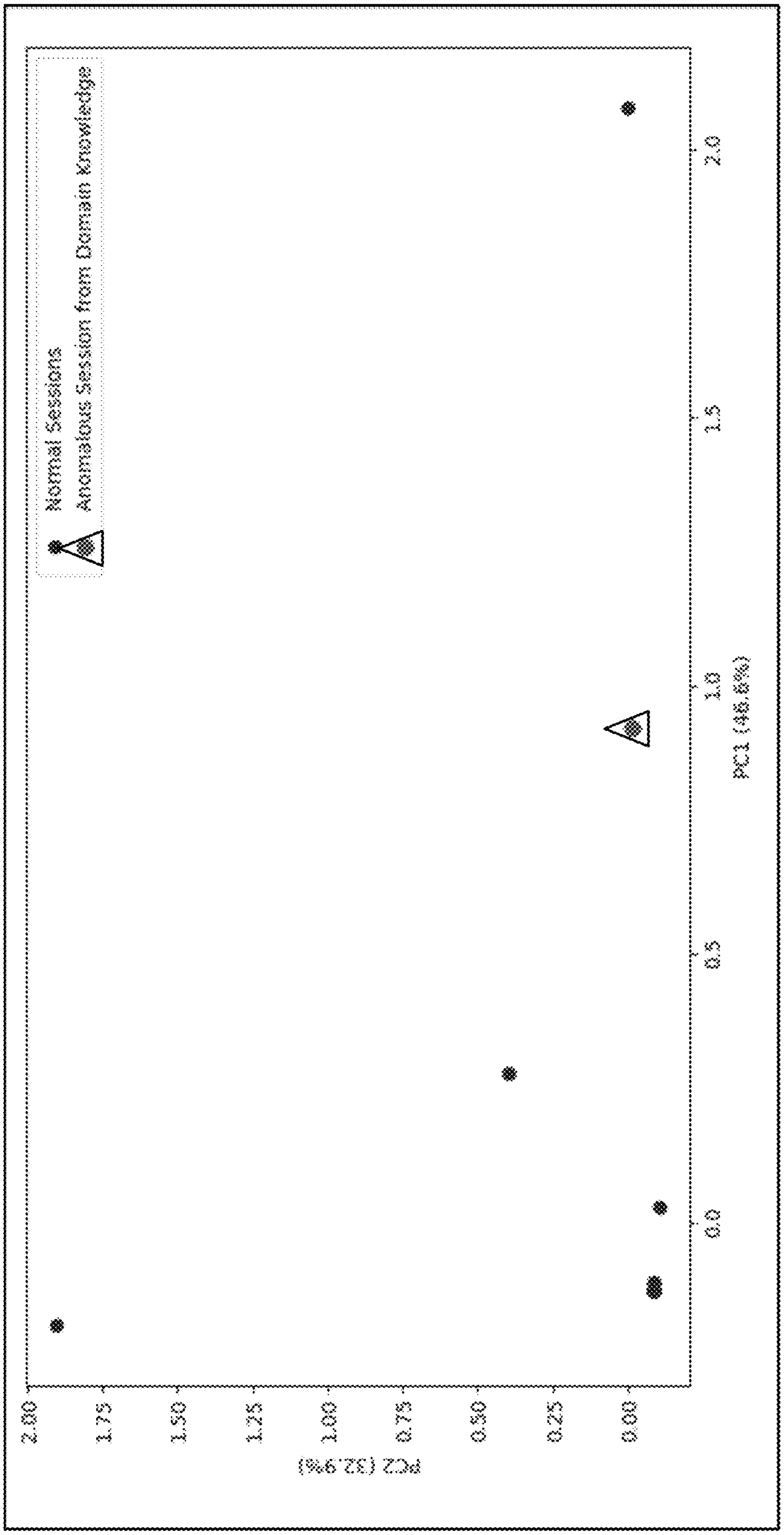
Figure 27:
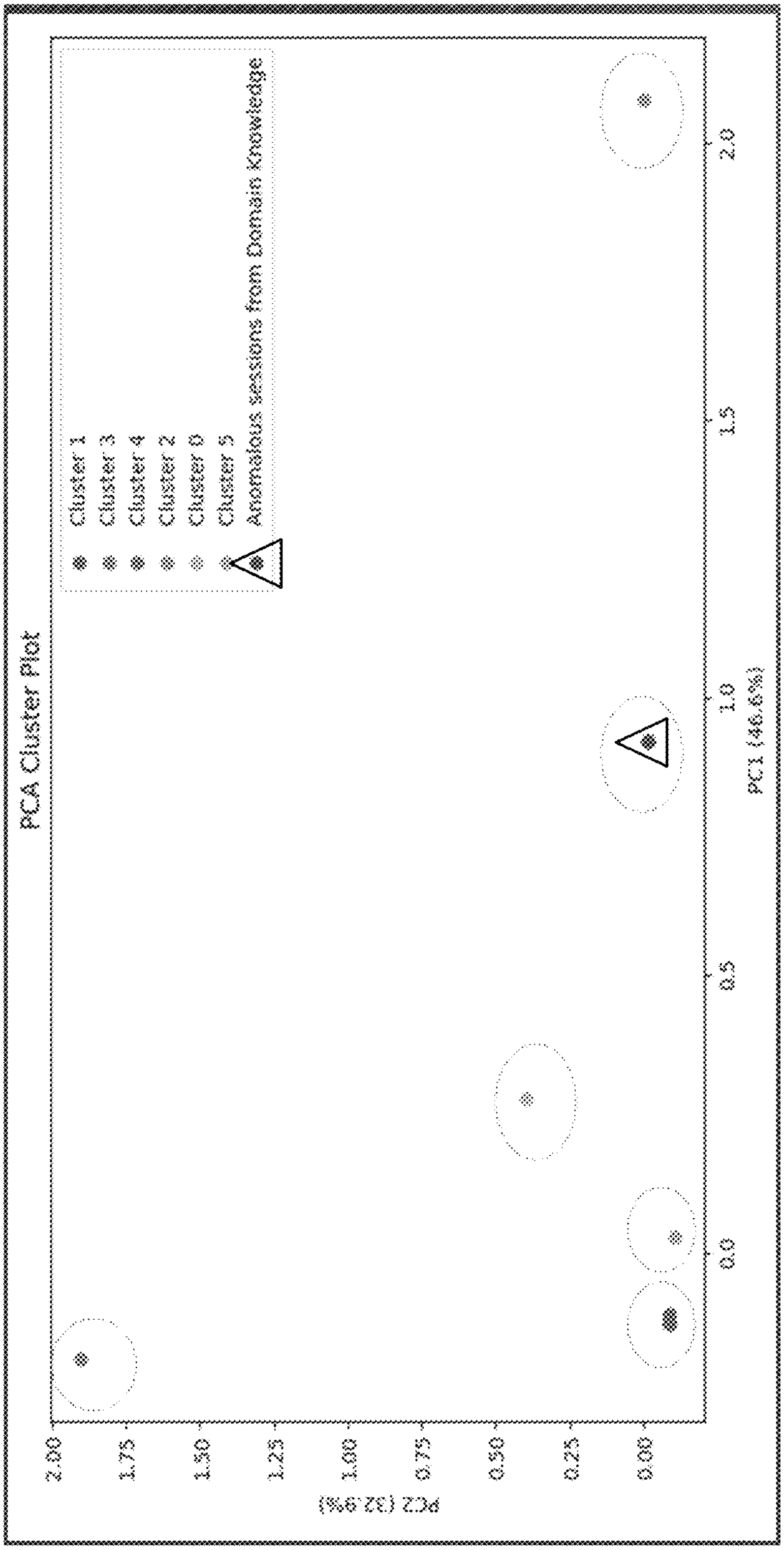
Figure 28:
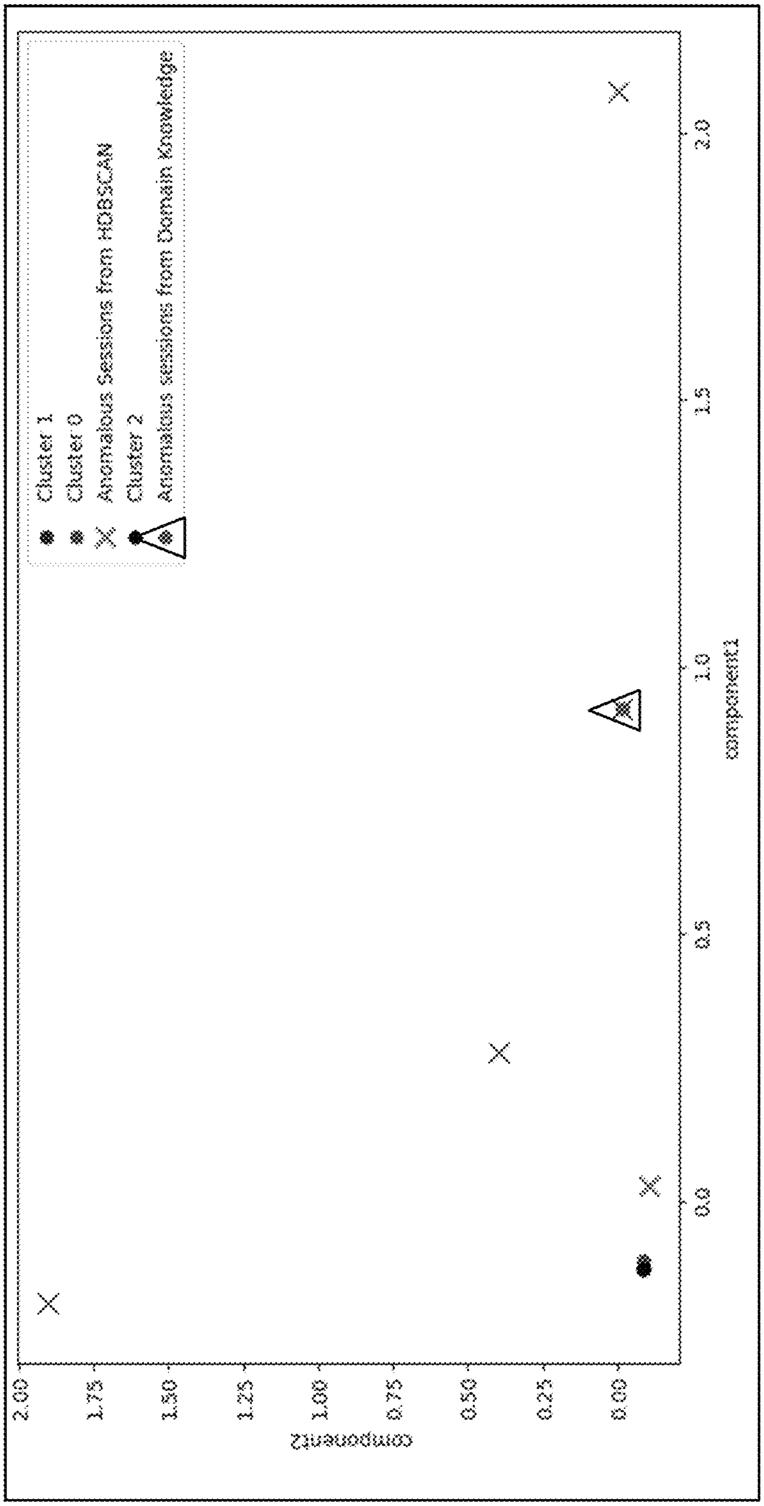
Figure 29:
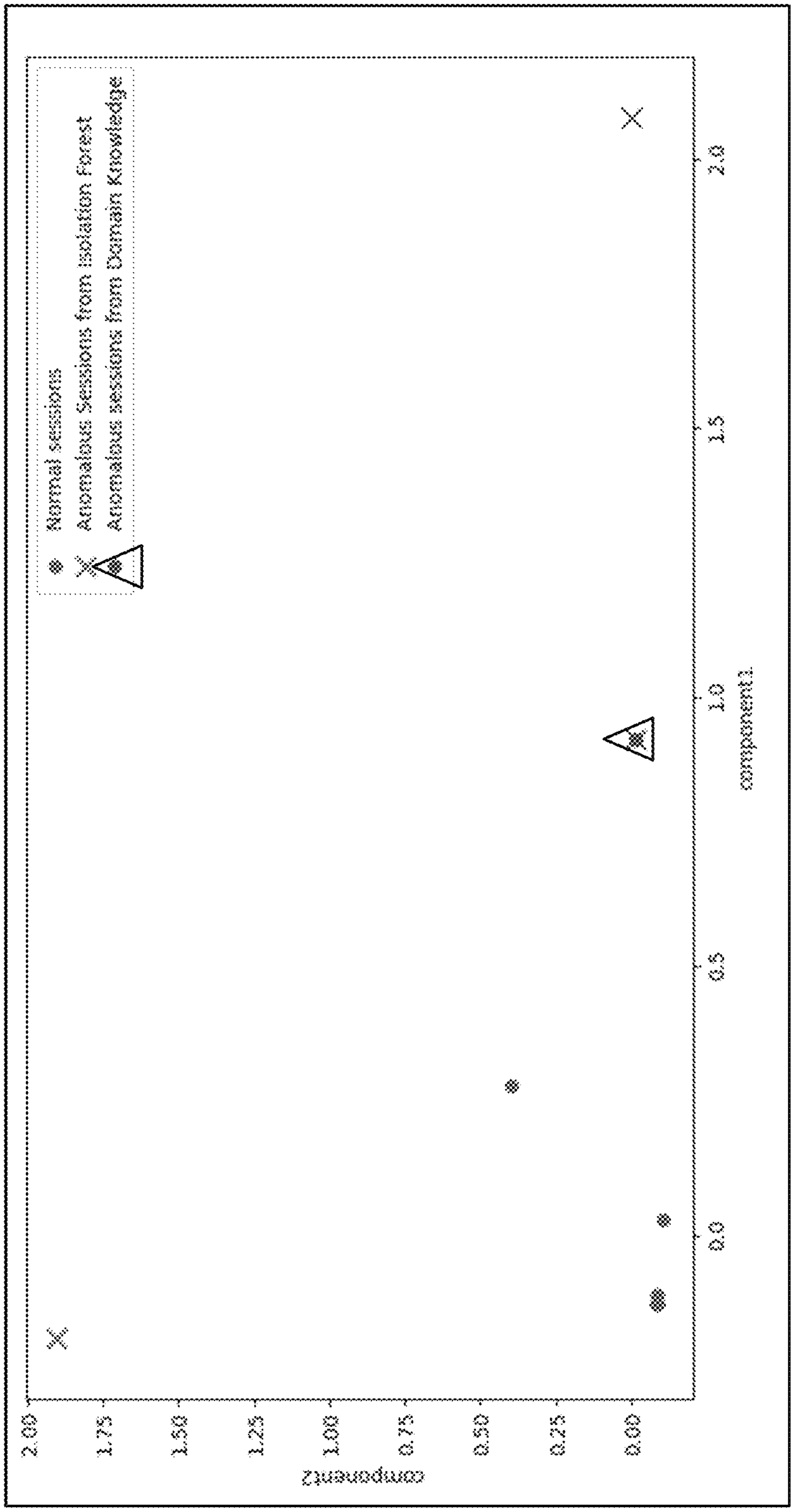
Figure 30:
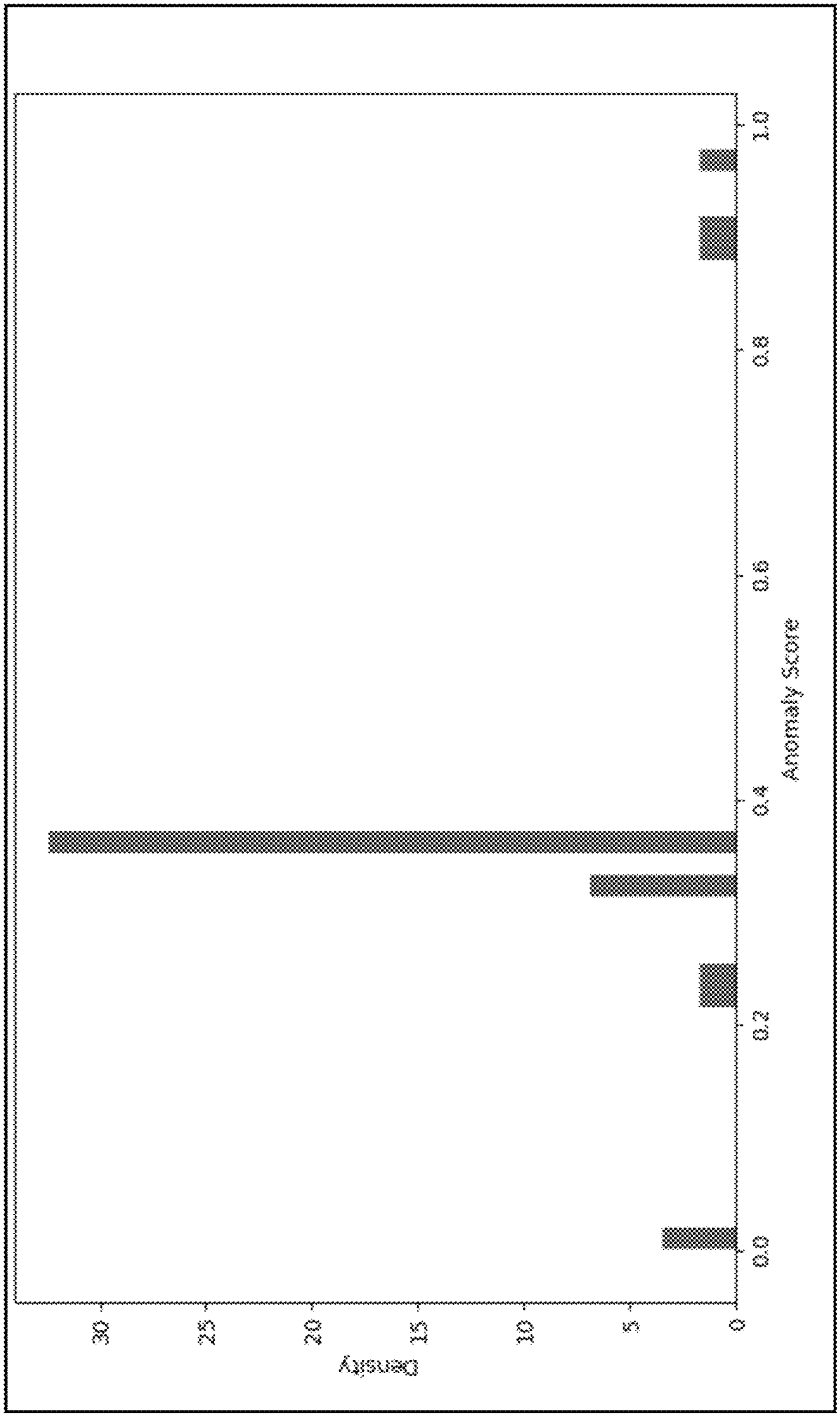

FIGS. 26-30 illustrate more experimental results using dataset #2 (explained with reference to FIG. 14). FIG. 26 illustrates the contextual sessions 42 generated from dataset #2 using a principal components analysis (or PCA). FIG. 27 illustrates k-means clustering using PCA visualization. By defining cluster size observing elbow curve, six (6) distinct clusters were determined. An anomalous contextual session of interest is clustered in cluster 4. Similarly, there are many other clusters with single point. These results show that k-means is not good algorithm for anomaly detection, but k-means can be used for initial grouping to see how contextual sessions 42 can be grouped. FIG. 28 illustrates HDBSCAN clustering using PCA visualization. HDBSCAN correctly flags anomalous contextual sessions 42 of interest. However, HDBSCAN also flags four (4) normal samples as anomalous. FIGS. 29-30 illustrate an Isolation Forest PCA visualization. Parameter: n_estimators=200, contamination=0.1. Like HDBSCAN, Isolation Forest correctly flagged contextual sessions 42 of interest as anomalous. A bonus is that the Isolation Forest technique gives less false positives than HDBSCAN (e.g., 2 normal contextual sessions 42 are flagged as anomalous, while HDBSCAN flagged 4 normal contextual sessions). Threshold value can be set to 0.7. During testing phase, this threshold score can be adjusted accordingly by observing false positive rates.

FIG. 31 further illustrates the experimental results. The Isolation Forest technique accurately detects anomalous contextual sessions 42 of interest in both datasets #1-2 with less false positive rate than HDBSCAN. The Isolation Forest technique, when deployed as the machine learning model 110, better predicts the contextual sessions 42 having the abnormal operation 80. The Isolation Forest technique thus reduces the need for escalated review by human analysts.

Figure 32:
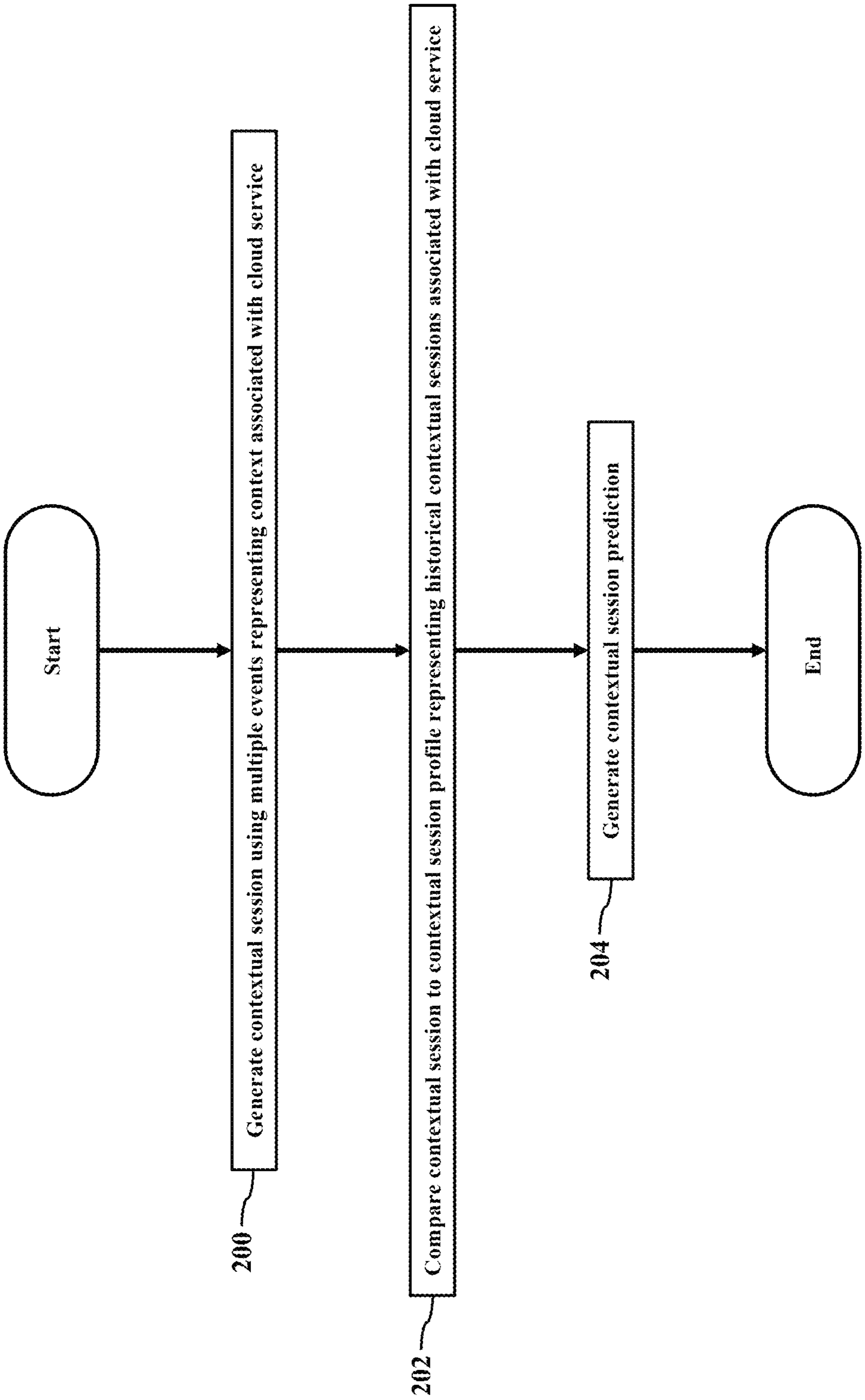
FIG. 32 illustrates examples of a method or operations for monitoring the cloud service.

FIG. 32 illustrates examples of a method or operations for monitoring the cloud service 28. The contextual session 42 is generated representing the context 40 using the multiple events 92 associated with the cloud service 28 (Block 200). The contextual session 42 is compared to the contextual session profile 62 representing historical contextual sessions 42 associated with the cloud service 28 (Block 202). The contextual session prediction 70 is generated based on the comparing of the contextual session 42 to the contextual session profile 62 representing the historical contextual sessions 42 associated with the cloud service 28 (Block 204).

Figure 33:
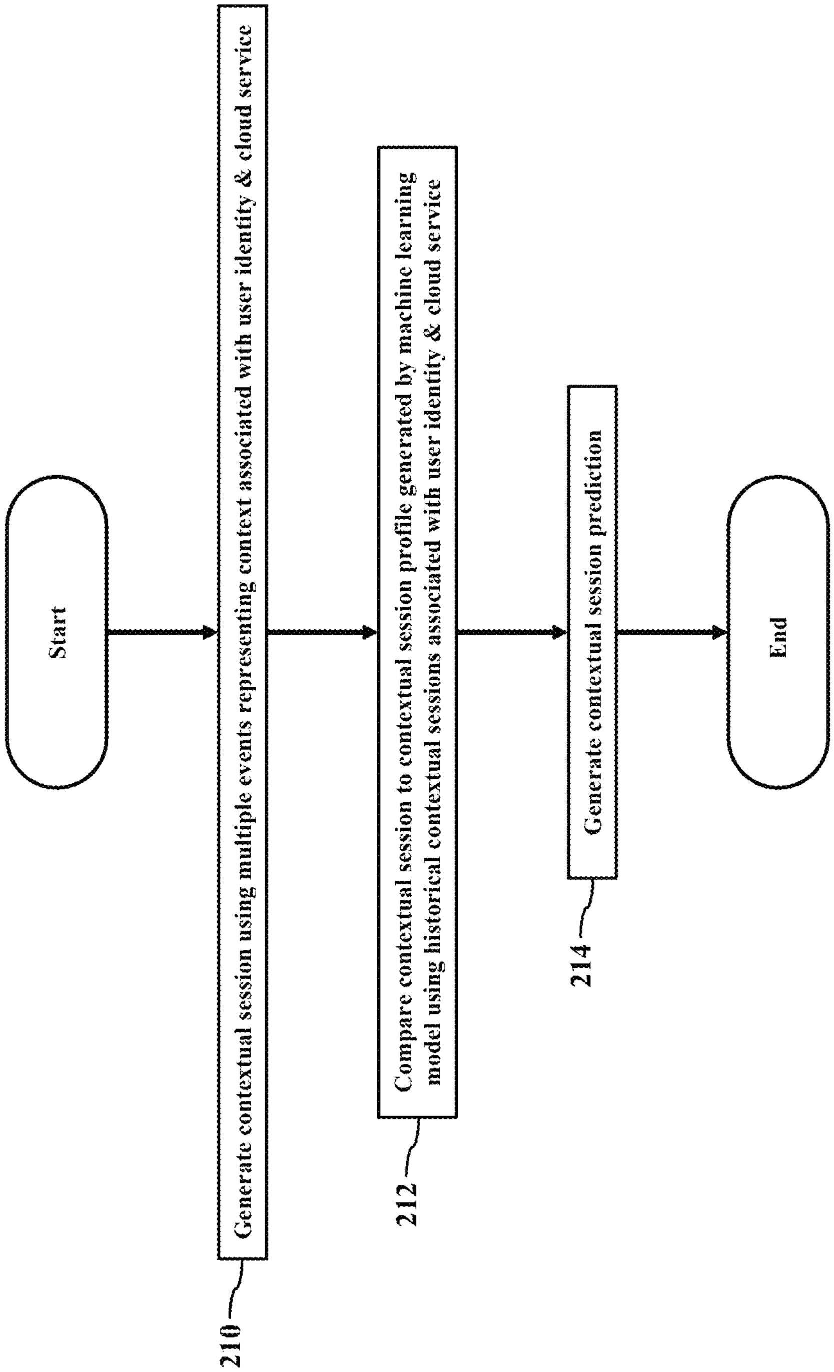
FIG. 33 illustrates more examples of a method or operations for monitoring the cloud service.

FIG. 33 illustrates more examples of a method or operations that monitor the cloud service 28. The contextual session 42 is generated representing the context 40 using the multiple events 92 associated with the user identity 44 and the cloud service 28 (Block 210). The contextual session 42 is compared to the contextual session profile 62 generated by the machine learning model 110 trained using historical contextual sessions 42 representing historical contexts 40 associated with the user identity 44 and the cloud service 28 (Block 212). The contextual session prediction 70 is generated based on the comparing of the contextual session 42 to the contextual session profile 62 generated by the machine learning model (Block 214).

FIGS. 34-35 illustrate more examples of a method or operations that monitor the cloud service 28. The historical contextual sessions 42 are identified representing the historical contexts 40 associated with the user identity 44 and the cloud service 28 (Block 220). The session files 140 are generated based on the historical contextual sessions 42 (Block 222). The tabular representation 144 of the session files 140 is generated representing the historical contexts 40 associated with the user identity 44 and the cloud service 28 (Block 224). The contextual session profile 62 is generated by training the machine learning model 110 using the session-level features 130 extracted from the tabular representation 144 of the session files 140 (Block 226).

As FIG. 35 illustrates, the multiple events 92 are received (Block 228). The current contextual session(s) 42 is/are generated that represent the current context 40 (Block 230). The contextual session(s) 42 is/are compared to the contextual session profile 62 generated by the machine learning model 110 (Block 232). The contextual prediction is generated based on the comparing of the contextual session 42 to the contextual session profile 62 (Block 234).

Figure 36:
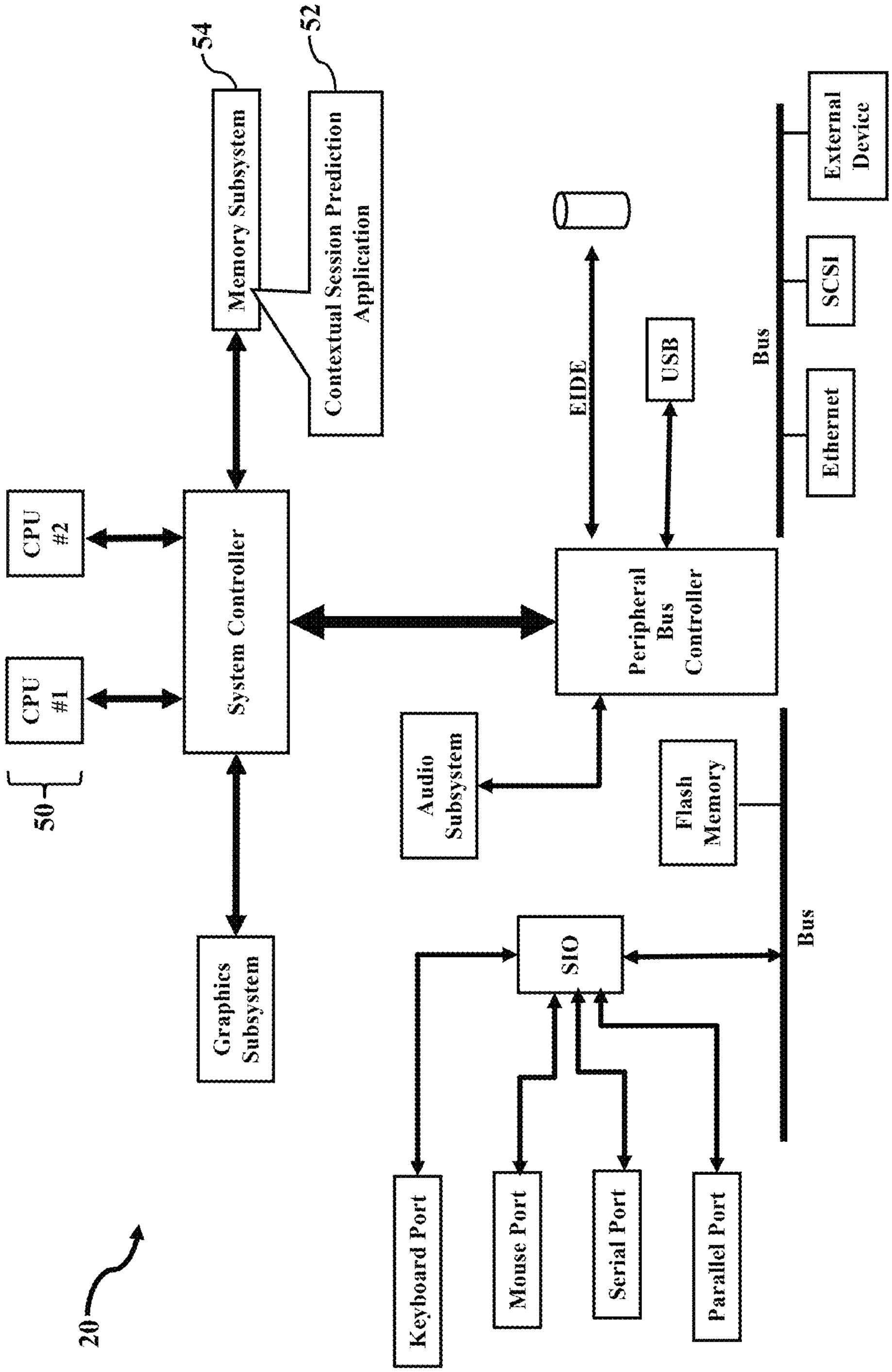
FIG. 36 illustrates a more detailed example of the operating environment.

FIG. 36 illustrates a more detailed example of the operating environment. FIG. 36 is a more detailed block diagram illustrating the computer system 20. The contextual session prediction application 52 is stored in the memory subsystem or device 54. One or more of the hardware processors 50 communicate with the memory subsystem or device 54 and execute the contextual session prediction application 52. Examples of the memory subsystem or device 54 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology.

The computer system 20 may have any embodiment. This disclosure mostly discusses the computer system 20 as the server 24. The contextual session prediction service 48, however, may be easily adapted to mobile computing, wherein the computer system 20 may be the smartphone 34, the laptop computer 162, a switch/router, a tablet computer, or a smartwatch. The contextual session prediction service 48 may also be easily adapted to other embodiments of smart devices, such as a television, an audio device, a remote control, and a recorder. The contextual session prediction service 48 may also be easily adapted to still more smart appliances, such as washers, dryers, and refrigerators. Indeed, as cars, trucks, and other vehicles grow in electronic usage and in processing power, the contextual session prediction service 48 may be easily incorporated into any vehicular controller.

The above examples of the contextual session prediction service 48 may be applied regardless of communications networking technology and networking environment. The contextual session prediction service 48 may be easily adapted to stationary or mobile devices having wide-area networking (e.g., 4G/LTE/5G/6G cellular), wireless local area networking (WI-FI®), near field, and/or BLUETOOTH® capability. The contextual session prediction service 48 may be applied to stationary or mobile devices utilizing any portion of the electromagnetic spectrum and any signaling standard (such as the IEEE 802 family of standards, GSM/CDMA/TDMA or any cellular standard, and/or the ISM band). The contextual session prediction service 48, however, may be applied to any processor-controlled device operating in the radio-frequency domain and/or the Internet Protocol (IP) domain. The contextual session prediction service 48 may be applied to any processor-controlled device utilizing a distributed computing network, such as the Internet (sometimes alternatively known as the "World Wide Web"), an intranet, a local-area network (LAN), and/or a wide-area network (WAN). The contextual session prediction service 48 may be applied to any processor-controlled device utilizing power line technologies, in which signals are communicated via electrical wiring. Indeed, the many examples may be applied regardless of physical componentry, physical configuration, or communications standard(s).

The environment may utilize any processing component, configuration, or system. For example, the contextual session prediction service 48 may be easily adapted to execute by any desktop, mobile, or server central processing unit 50 or chipset offered by INTEL®, ADVANCED MICRO DEVICES®, ARM®, APPLE®, TAIWAN SEMICONDUCTOR MANUFACTURING®, QUALCOMM®, or any other manufacturer. The computer system 20 may even use multiple central processing units 50 or chipsets, which could include distributed processors or parallel processors in a single machine or multiple machines. The central processing unit 50 or chipset can be used in supporting a virtual processing environment. The central processing unit 50 or chipset could include a state machine or logic controller. When any of the central processing units 50 or chipsets execute instructions to perform "operations," this could include the central processing unit or chipset performing the operations directly and/or facilitating, directing, or cooperating with another device or component to perform the operations.

The contextual session prediction service 48 may use packetized communications. When the computer system 20 and the cloud computing environment 22 communicate, information may be collected, sent, and retrieved. The information may be formatted or generated as packets of data according to a packet protocol (such as the Internet Protocol). The packets of data contain bytes of data describing the contents, or payload, of a message. A header of each packet of data may be read or inspected and contain routing information identifying an origination address and/or a destination address.

The contextual session prediction service 48 may utilize any signaling standard. The cloud-computing environment 22 may mostly use wired networks to interconnect the network members 26. However, the cloud-computing environment 22 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud-computing environment 22 may also utilize other standards, such as the I.E.E.E. 802 family of standards, the Industrial, Scientific, and Medical band of the electromagnetic spectrum, BLUETOOTH®, low-power or near-field, and any other standard or value.

The contextual session prediction service 48 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for monitoring the cloud service 28, as the above paragraphs explain.

The diagrams, schematics, illustrations, and tables represent conceptual views or processes illustrating examples of cloud services malware detection. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system that monitors a cloud service, comprising:

locally generating, by an endpoint agent monitoring the computer system, an endpoint user's personalized contextual session by chronologically arranging multiple events occurring within a timeframe representing time-based usage associated with an endpoint device and a user identity;

locally comparing, by the endpoint agent monitoring the computer system, the endpoint user's personalized contextual session to a contextual session profile representing the endpoint user's historical contextual sessions representing the endpoint user's historical strings of the multiple events occurring within the timeframe; and locally generating, by the endpoint agent monitoring the computer system, a contextual session prediction based on the comparing of the endpoint user's personalized contextual session to the endpoint user's historical contextual sessions representing the historical contextual sessions.

2. The method of claim 1, further comprising determining the endpoint user's personalized contextual session conforms to the endpoint user's historical contextual sessions.

3. The method of claim 2, wherein in response to the determining that the endpoint user's personalized contextual session conforms to the endpoint user's historical contextual sessions, further comprising categorizing the endpoint user's personalized contextual session as a normal operation.

4. The method of claim 1, further comprising approving the cloud service.

5. The method of claim 1, further comprising determining that the endpoint user's personalized contextual session fails to conform to the endpoint user's historical contextual sessions.

6. The method of claim 5, wherein in response to the determining that the endpoint user's personalized contextual session fails to conform to the endpoint user's historical contextual sessions, further comprising categorizing the endpoint user's personalized contextual session as an abnormal operation.

7. The method of claim 5, wherein in response to the determining that the endpoint user's personalized contextual session fails to conform to the endpoint user's historical contextual sessions, further comprising at least one of denying the cloud service or terminating the cloud service.

8. The method of claim 1, further comprising generating an alert notification indicating the endpoint user's personalized contextual session represents an abnormal operation.

9. At least one computer system that monitors a cloud service, comprising:

at least one central processing unit; and at least one memory device storing instructions that, when executed by the at least one central processing unit, perform operations, the operations comprising:

detecting multiple events by an endpoint agent monitoring a host operating system;

locally generating, by the endpoint agent monitoring the host operating system, an endpoint user's personalized contextual session by chronologically arranging the multiple events associated with a user identity and the cloud service occurring within a timeframe;

locally comparing, by the endpoint agent monitoring the host operating system, the endpoint user's personalized contextual session to a contextual session profile generated by a machine learning model trained using the endpoint user's historical contextual sessions representing the endpoint user's historical strings of the multiple events occurring within the timeframe; and locally generating, by the endpoint agent monitoring the host operating system, a contextual prediction based on the comparing of the endpoint user's personalized contextual session to the contextual session profile representing the endpoint user's historical strings of the multiple events occurring within the timeframe.

10. The at least one computer system of claim 9, wherein the operations further comprise determining the endpoint user's personalized contextual session conforms to the contextual session profile.

11. The at least one computer system of claim 10, wherein the operations further comprise categorizing the endpoint user's personalized contextual session as a normal operation.

12. The at least one computer system of claim 10, wherein the operations further comprise approving the cloud service.

13. The at least one computer system of claim 9, wherein the operations further comprise determining that the endpoint user's personalized contextual session fails to conform to the contextual session profile.

14. The at least one computer system of claim 13, wherein the operations further comprise categorizing the endpoint user's personalized contextual session as an abnormal operation.

15. The at least one computer system of claim 13, wherein the operations further comprise generating a contextual alert notification indicating the contextual session represents an abnormal operation.

16. The at least one computer system of claim 9, wherein the operations further comprise at least one of denying the cloud service or terminating the cloud service.

17. A memory device storing instructions that, when executed by at least one central processing unit, perform operations that monitor a cloud service, the operations comprising: detecting multiple events by an endpoint agent monitoring a host operating system; locally generating, by the endpoint agent monitoring the host operating system, an endpoint user's personalized contextual session by chronologically arranging the multiple events associated with a user identity and the cloud service occurring within a timeframe; locally comparing, by the endpoint agent monitoring the host operating system, the endpoint user's personalized contextual session to a contextual session profile generated by a machine learning model trained using the endpoint user's historical contextual sessions representing the endpoint user's historical strings of the multiple events occurring within the timeframe; and locally generating, by the endpoint agent monitoring the host operating system, a contextual prediction based on the comparing of the endpoint user's personalized contextual session to the contextual session profile representing the endpoint user's historical strings of the multiple events occurring within the timeframe.

18. The memory device of claim 17, wherein the operations further comprise determining that the endpoint user's personalized contextual session fails to conform to the contextual session profile.

19. The memory device of claim 18, wherein the operations further comprise categorizing the endpoint user's personalized contextual session as an abnormal operation.

20. The memory device of claim 17, wherein the operations further comprise generating a contextual alert notification indicating the contextual session represents an abnormal operation.

* * * * *